(12) United States Patent
Wu et al.

(10) Patent No.: US 11,368,245 B2
(45) Date of Patent: Jun. 21, 2022

(54) BLIND DETECTION METHOD, SIGNAL TRANSMISSION METHOD, RELEVANT DEVICES AND SYSTEM

(71) Applicant: VIVO MOBILE COMMUNICATION CO., LTD., Chang'an Dongguan (CN)

(72) Inventors: Kai Wu, Chang'an Dongguan (CN); Dajie Jiang, Chang'an Dongguan (CN); Yu Ding, Chang'an Dongguan (CN); Fei Qin, Chang'an Dongguan (CN); Na Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 106 days.

(21) Appl. No.: 16/628,886

(22) PCT Filed: Jul. 5, 2018

(86) PCT No.: PCT/CN2018/094636
§ 371 (c)(1),
(2) Date: Jan. 6, 2020

(87) PCT Pub. No.: WO2019/007389
PCT Pub. Date: Jan. 10, 2019

(65) Prior Publication Data
US 2021/0367707 A1 Nov. 25, 2021

(30) Foreign Application Priority Data
Jul. 5, 2017 (CN) .......................... 201710543348.9

(51) Int. Cl.
*H04W 52/02* (2009.01)
*H04L 1/00* (2006.01)
*H04J 13/00* (2011.01)
*H04W 56/00* (2009.01)
*H04W 72/04* (2009.01)

(52) U.S. Cl.
CPC ........ *H04L 1/0038* (2013.01); *H04J 13/0029* (2013.01); *H04J 13/0062* (2013.01);
(Continued)

(58) Field of Classification Search
CPC ......... H04W 52/0216; H04W 74/0833; H04W 72/042; H04W 72/1284; H04W 76/28;
(Continued)

(56) References Cited

U.S. PATENT DOCUMENTS

2014/0211673 A1* 7/2014 Lu ..................... H04W 52/0212
370/311
2016/0007406 A1 1/2016 Yi et al.
(Continued)

FOREIGN PATENT DOCUMENTS

CN 102932950 A 2/2013
CN 103200653 A 7/2013
(Continued)

OTHER PUBLICATIONS

Extended European Search Report related to Application No. 18828695.9 dated May 12, 2020.
(Continued)

*Primary Examiner* — Jung Liu
(74) *Attorney, Agent, or Firm* — von Briesen & Roper, s.c.

(57) ABSTRACT

The present disclosure provide a blind detection method, a signal transmission method, relevant devices and a system. The method includes: receiving a target signal transmitted from a network device; and based on the target signal, performing blind detection on PDCCH or maintaining a sleep state when detecting the PDCCH.

20 Claims, 6 Drawing Sheets

(52) U.S. Cl.
CPC ..... *H04W 52/0229* (2013.01); *H04W 56/001* (2013.01); *H04W 72/042* (2013.01); *H04W 72/0446* (2013.01); *H04W 72/0453* (2013.01)

(58) Field of Classification Search
CPC ............. H04W 52/0235; H04W 56/00; H04W 56/001; H04W 24/10; H04W 48/16; H04L 5/00; H04L 5/0048; H04L 5/0012; H04L 25/0204; H04L 25/0224; H04L 27/2613; H04L 5/0091; H04L 1/00; H04L 27/26; H04L 5/0035; H04L 5/0023; H04L 5/0082; H04L 1/0026; Y02D 30/70; H04J 11/00; H04J 11/0093; H04B 7/26
See application file for complete search history.

(56) References Cited

U.S. PATENT DOCUMENTS

| | | | |
|---|---|---|---|
| 2016/0219557 A1 | 7/2016 | He et al. | |
| 2017/0078062 A1* | 3/2017 | Park | H04W 56/001 |
| 2018/0332533 A1* | 11/2018 | Bhattad | H04W 52/0216 |
| 2019/0357159 A1* | 11/2019 | Pan | H04L 5/0007 |
| 2020/0008216 A1* | 1/2020 | Iyer | H04W 72/04 |
| 2020/0022125 A1* | 1/2020 | Li | H04L 5/0005 |
| 2020/0059862 A1* | 2/2020 | Wong | H04W 76/27 |

FOREIGN PATENT DOCUMENTS

| | | |
|---|---|---|
| CN | 102612849 B | 8/2015 |
| CN | 101783717 A | 7/2020 |
| EP | 3139658 A1 | 3/2017 |
| WO | WO 2010/124444 A1 | 11/2010 |

OTHER PUBLICATIONS

International Search Report related to Application No. PCT/CN2018/094636 dated Sep. 13, 2018.

Chinese Search Report related to Application No. 201710543348.9 dated Apr. 16, 2019.

* cited by examiner

BLIND DETECTION METHOD, SIGNAL
TRANSMISSION METHOD, RELEVANT
DEVICES AND SYSTEM

CROSS-REFERENCE TO RELATED
APPLICATION

This application is the U.S. national phase of PCT Application PCT/CN2018/094636 filed on Jul. 5, 2018, which claims the benefit and priority of Chinese Application No. 201710543348.9, filed on Jul. 5, 2017, the disclosures of which are incorporated in their entirety by reference herein.

TECHNICAL FIELD

The present disclosure relates to a communication technology field, and more particularly to a blind detection method, a signal transmission method, relevant devices and a system.

BACKGROUND

With the development of communication technology, the 5G New Radio (NR) communication system is gradually put on the agenda. Compared with the Long Term Evolution (LTE) communication system, the NR communication system has the advantages of high transmission rate, large capacity, high reliability and large coverage, etc. The application of the NR communication system can improve the communication ability to a new level.

In the communication process of the current NR communication system, the User Equipment (UE) usually needs to periodically conduct blind detection on the Physical Downlink Control Channel (PDCCH) to determine whether there is a PDCCH signal and the transmission of the corresponding Physical Downlink Shared Channel (PDSCH) signal. For instance, in the idle state of Radio Resource Control (RRC), the PDCCH is detected periodically according to the preconfigured time. If the PDCCH signal is detected, whether a paging signal received by the UE is that of the UE is further determined. Alternatively, in a Discontinuous Reception (DRX) state, the UE discontinuously performs the blind detection on the PDCCH. If detecting the PDCCH signal, the UE conducts subsequent operations according to the type of the PDCCH signal. Due to the high power consumption of each blind detection performed by the UE on the PDCCH, while the UE cannot detect the PDCCH signal in most cases in the blind detection of the PDCCH, which wastes the energy consumption of the UE, resulting in high energy consumption. It can be seen that the current NR communication system has the problem of high UE energy consumption in the communication process.

SUMMARY

According to a first aspect, embodiments of the present disclosure provide a blind detection method, including:
receiving a target signal transmitted from a network device; and
based on the target signal, performing blind detection on Physical Downlink Control Channel (PDCCH) or maintaining a sleep state when detecting the PDCCH.

According to a second aspect, embodiments of the present disclosure further provide a signal transmission method, including:
transmitting a target signal to a User Equipment (UE), so that the UE performs blind detection on Physical Downlink Control Channel (PDCCH) or maintains a sleep state when detecting the PDCCH.

According to a third aspect, embodiments of the present disclosure further provide a User Equipment (UE), including:
a first receiving module, configured to receive a target signal transmitted from a network device; and
a processing module, configured to, based on the target signal, perform blind detection on Physical Downlink Control Channel (PDCCH) or maintain a sleep state when detecting the PDCCH.

According to a fourth aspect, embodiments of the present disclosure provide a network device, including:
a first transmission module, configured to transmit a target signal to a User Equipment (UE), so that the UE performs blind detection on Physical Downlink Control Channel (PDCCH) or maintains a sleep state when detecting the PDCCH.

According to a fifth aspect, embodiments of the present disclosure provide a User Equipment (UE), including: a processor, a storage, a network interface and a user interface, where the processor, the storage, the network interface and the user interface are coupled together via a bus system, and the processor is configured to read programs in the storage to execute steps in the blind detection method.

According to a sixth aspect, embodiments of the present disclosure provide a network device, including: a processor, a storage, a transceiver and a user interface, where the processor, the storage, the transceiver and the user interface are coupled together via a bus system, and the processor is configured to read programs in the storage to execute steps in the signal transmission method.

According to a seventh aspect, embodiments of the present disclosure provide a blind detection system, including the UE and network device provided by embodiments of the present disclosure.

According to an eighth aspect, embodiments of the present disclosure provide a computer readable storage medium. The computer readable storage medium stores blind detection programs and when the blind detection programs are executed by the processor, steps in the blind detection method are implemented.

According to a ninth aspect, embodiments of the present disclosure provide a computer readable storage medium. The computer readable storage medium stores signal transmission programs and when the signal transmission programs are executed by the processor, steps in the signal transmission method are implemented.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

Technical schemes in embodiments of the present disclosure are clearly and completely described hereinafter with reference to the accompanying drawings. Apparently, the described embodiments are partial of the present disclosure, rather than all embodiments. Based on the embodiments in the present disclosure, all other embodiments obtained by those skilled in the art of the present disclosure without creative works are in the scope of the present disclosure.

Figure 1:
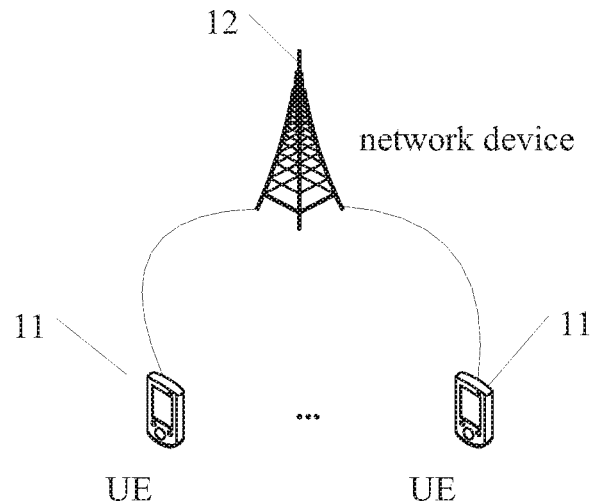
FIG. 1 is a schematic diagram illustrating structure of a blind detection system in accordance with various embodiments of the present disclosure.

Referring to FIG. 1, FIG. 1 is a schematic diagram illustrating structure of a blind detection system in accordance with various embodiments of the present disclosure. As shown in FIG. 1, the system includes multiple UEs 11 and a network device 12. The UE 11 may be a mobile phone, a tablet personal computer, a laptop computer, a Personal Digital Assistant (called PDA for short), a Mobile Internet Device (MID) or a wearable device, etc. It should be noted that embodiments of the present disclosure do not make limitations on the specific type of the UE 11. In addition, the above multiple UEs 11 can include UEs with different bandwidth capabilities, for example, including the UE that supports the broadband and the UE that supports narrowband. The UE that supports the broadband may be the UE that supports the maximum bandwidth spectrum of the carrier (such as Pcell or Scell). Of course, embodiments of the present disclosure do not make limitations on this. For instance, the UE that supports the bandwidth may also be the UE that supports the preset broadband frequency band (such as, 400 MHZ or 300 MHZ). However, the above-mentioned UE that supports the narrowband can be the UE that only supports partial bandwidth of the maximum bandwidth band of the carrier, for example, the UE that only supports 20 MHz or 100 MHz.

The network device 12 may be a Transmission Reception Point (TRP) or a base station. The base station may be a macro station, such as LTE eNB and 5G NR NB, etc. The network device 12 may be an Access Point (AP).

It should be noted that embodiments of the present disclosure do not make limitation on the specific type of the network device 12. Specific functions of the UE 11 and the network device 12 may be specifically described via following multiple embodiments.

Figure 2:
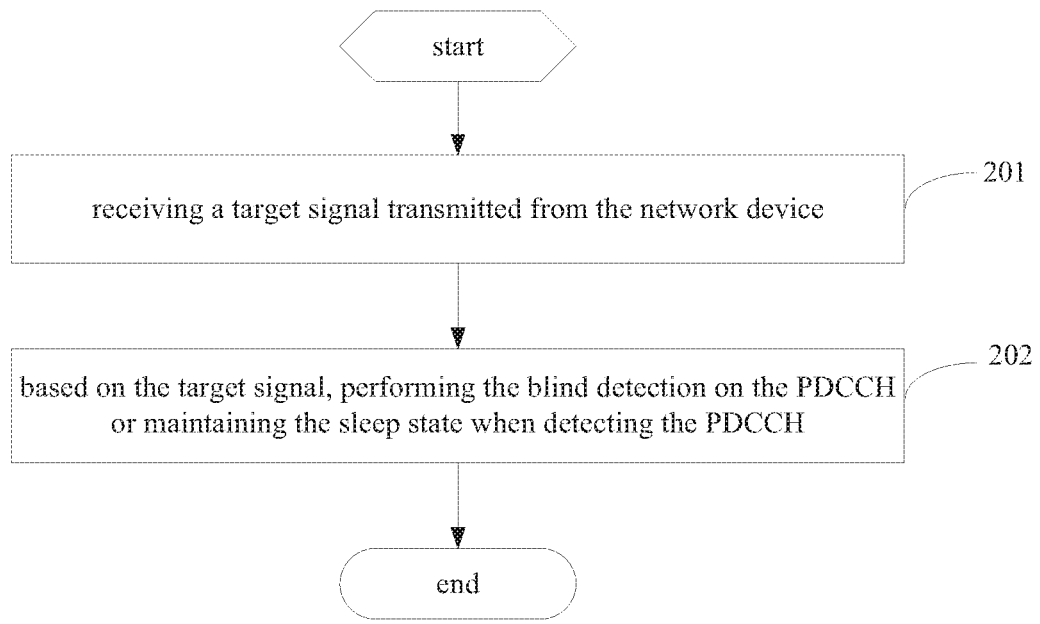
FIG. 2 is a flow chart illustrating a blind detection method in accordance with various embodiments of the present disclosure.

Referring to FIG. 2, FIG. 2 is a flow chart illustrating a blind detection method in accordance with various embodiments of the present disclosure. As shown in FIG. 2, following blocks are included:

Block 201: receiving a target signal transmitted from the network device.

In this embodiment of the present disclosure, receiving the target signal transmitted from the network device may include receiving a wake-up signal transmitted from the network device. The wake-up signal is used to wake up the UE to perform blind detection on the PDCCH. Receiving the target signal transmitted from the network device may be receiving a sleep signal transmitted from the network device. The sleep signal is used to enable the UE to maintain a sleep state when the PDCCH is detected.

It should be noted that before transmitting an indication signal, the network device may group covered UEs and transmit a same indication signal to UEs in a same group. When a UE receives an indication signal transmitted from the network device for the UE group, at which the UE is located, the UE performs the blind detection on the PDCCH or maintains the sleep state when the PDCCH is detected.

Block 202: performing the blind detection on the PDCCH or maintaining the sleep state based on the target signal when the PDCCH is detected.

In this embodiment of the present disclosure, the blind detection is performed on the PDCCH based on the target signal. It can be that the UE determines that the received indication signal is the target signal transmitted from the network device for the UE or for the UE group, at which the UE is located, i.e. the UE determines that the target signal is received, the UE performs the blind detection for the PDCCH or maintains the sleep state when the PDCCH is detected.

This embodiment of the present disclosure includes: receiving the target signal transmitted from the network device, performing the blind detection on the PDCCH or maintaining the sleep state based on the target signal when the PDCCH is detected. Periodic blind detection performed by the UE on the PDCCH may be avoided, so that the energy consumption of the UE may be reduced.

Figure 3:
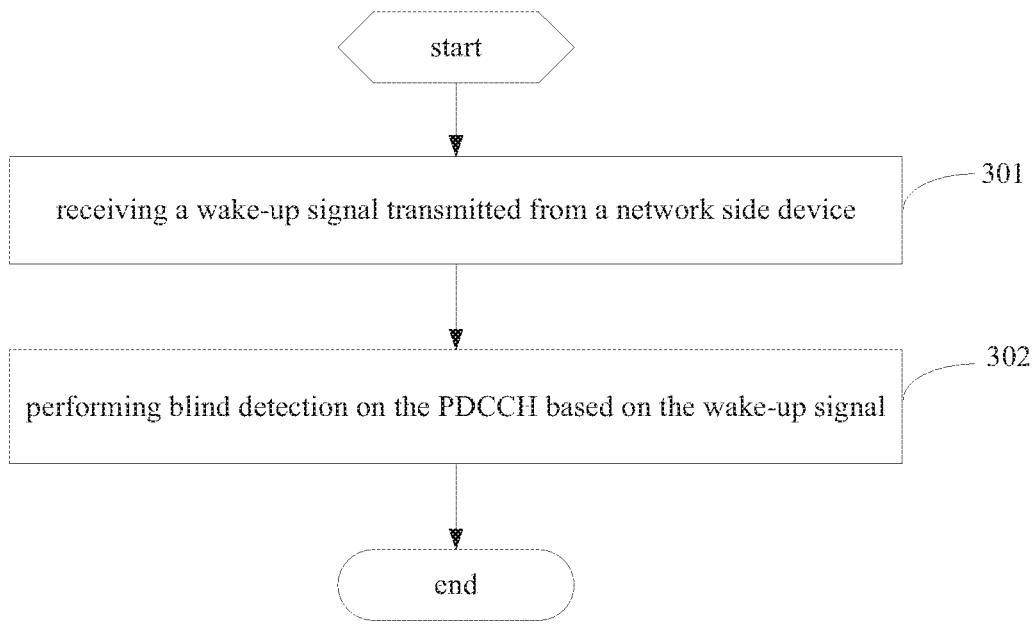
FIG. 3 is a flow chart illustrating another blind detection method in accordance with various embodiments of the present disclosure.

Referring to FIG. 3, FIG. 3 is a flow chart illustrating a blind detection method in accordance with various embodiments of the present disclosure. As shown in FIG. 3, this embodiment of the present disclosure is described taking the target signal as the wake-up signal and following blocks are included:

Block 301: receiving a wake-up signal transmitted from a network device.

In this embodiment of the present disclosure, the above receiving the wake-up signal transmitted from the network device may be that the UE receives the wake-up signal transmitted from the network device in a Radio Resource Control (RRC) idle state or in a Discontinuous Reception (DRX) state. The wake-up signal is used to wake up the UE to perform the blind detection on the PDCCH.

The above receiving the wake-up signal transmitted from the network device may be receiving the wake-up signal, which is transmitted from the network device in a moment except for that corresponding to a Synchronization Signal (SS) block or in a bandwidth except for that corresponding to the SS block using periodic transmission characteristics of the SS block.

Optionally, the above block 301 may include: receiving the wake-up signal transmitted from the network device at a moment corresponding to a synchronization signal block, or receiving the wake-up signal transmitted from the network device in a bandwidth corresponding to the synchronization signal block or receiving the wake-up signal transmitted from the network device at the moment corresponding to the synchronization signal block and in the bandwidth corresponding to the synchronization signal block. Through receiving the wake-up signal transmitted from the network device at the moment corresponding to the synchronization signal block or in the bandwidth corresponding to the synchronization signal block, resources occupied for transmitting and receiving the wake-up signal may be effectively saved and resource utilization of the synchronization signal block may be improved.

In this embodiment, the above receiving the wake-up signal transmitted from the network device at the moment corresponding to the synchronization signal block may include: receiving the wake-up signal transmitted from the network device on resources of Orthogonal Frequency Division Multiplexing (OFDM) symbols occupied by a Primary Synchronization Signal (PSS) or Secondary Synchronization Signal (SSS) of a transmitted synchronization signal block or receiving the wake-up signal transmitted on OFDM symbols occupied by a DL control channel, UL control channel or guard interval of a slot, at which the synchronization signal block is located.

Further, optionally, the step of receiving the wake-up signal transmitted from the network device at the moment corresponding to the synchronization signal block includes:

receiving the wake-up signal, which is transmitted from the network device on idle resources of OFDM symbols, at which a primary synchronization signal included in the synchronization signal block is located; or receiving the wake-up signal, which is transmitted from the network device on idle resources of OFDM symbols, at which a secondary synchronization signal included in the synchronization signal block is located; or receiving the wake-up signal, which is transmitted from the network device on the idle resources of the OFDM symbols, at which the primary synchronization signal included in the synchronization signal block is located and on the idle resources of the OFDM symbols, at which the secondary synchronization signal included in the synchronization signal block is located; or receiving the wake-up signal, which is transmitted from the network device on idle OFDM symbols of a slot, at which the synchronization signal block is located; or receiving the wake-up signal, which is transmitted from the network device on all or partial of idle resources of the synchronization signal block.

In this embodiment, the idle resources may be resources in 4 OFDM symbols and 288 sub-carrier bandwidths occupied by the synchronization signal block, except for those occupied by the PSS, SSS, physical broadcast channel signal and physical broadcast channel demodulation reference signal. The idle OFDM symbols include OFDM symbols in OFDM symbols of the slot, at which the synchronization signal block is located, except for those occupied by the DL control channel, the UL control channel and the guard interval. Via transmitting the wake-up signal in the idle resources or idle OFDM symbols, the resource utilization of the synchronization signal block may be further improved.

Further, the above receiving the wake-up signal transmitted from the network device in partial of the idle resources of the synchronization signal block may be that the network device predefines or preconfigures partial of the idle resources of the synchronization signal block for the UE and transmits the wake-up signal on the predefined or preconfigured partial resources. The above predefined partial resources may be those defined following a communication protocol, which is preset between the network device and the UE. The preconfigured partial resources may be those indicated by the configuration information, which is transmitted to the UE by the network device in advance.

Further, optionally, the step of receiving the wake-up signal from the network device in the bandwidth corresponding to the synchronization signal block includes: receiving the wake-up signal transmitted from the network device on partial or all sub-carriers for transmitting the synchronization signal block. Via transmitting the wake-up signal on partial or all sub-carriers for transmitting the synchronization signal block, the resource utilization of the synchronization signal block may be further improved.

For instance, it may be receiving the wake-up signal transmitted from the network device on 288 sub-carriers for transmitting the synchronization signal block, or receiving the wake-up signal transmitted from the network device on partial of the 288 sub-carriers for transmitting the synchronization signal block.

Optionally, the block 301 may include: receiving the target signal transmitted from the network device when the UE performs radio resource management measurement. The UE may receive the wake-up signal transmitted from the network device when the UE performs the radio resource management measurement. At that moment, the UE not only can receive the wake-up signal, but also can conduct radio management measurement, thus the energy consumption of the UE may be reduced.

The above Radio Resource Management (RRM) measurement may include the Reference Signal Receiving Power (RSRP) measurement, Reference Signal Received Quality (RSRQ) measurement, and Received Signal Strength Indication (RSSI) measurement, etc. In addition, receiving the wake-up signal transmitted from the network device when the user terminal is carrying out the radio resource management measurement can be receiving the wake-up signal transmitted from network device when the user terminal is carrying out radio resource management measurement and on the idle resources or idle OFDM symbols.

In this embodiment of the present disclosure, receiving the wake-up signal transmitted from the network device may be receiving the wake-up signal transmitted from the network device on beams except for those used for transmitting the synchronization signal block. In an alternative, optionally, the block 301 may include: receiving the wake-up signal transmitted from the network device on a target beam. The target beam is a beam used by the network device for transmitting the synchronization signal block. By transmitting wake-up signal on the beam used by the network device for transmitting the synchronization signal block, resources occupied by the network device for transmitting the wake-up signal may be reduced and the resources occupied by the UE for receiving the wake-up signal may be reduced, thus the energy consumption of the network device and the UE may be reduced.

The above receiving the wake-up signal transmitted from the network device on the target beam may be receiving the wake-up signal transmitted from the network device on the target beam and when the UE performs the radio resource management measurement.

Optionally, the above block 401 may include:

when a period of a synchronization signal block set is larger than a discontinuous reception period of the UE, receiving at least one of at least two wake-up signals transmitted from the network device in the period of the synchronization signal block set; or when the period of the synchronization signal block set is larger than the discontinuous reception period of the UE, receiving the wake-up signal transmitted from the network device in a configured slot; or when the period of the synchronization signal block set is larger than the discontinuous reception period of the UE, receiving at least one of wake-up signals transmitted from the network device in the period of at least one of two adjacent synchronization signal block sets and in the configured slot;

wherein the configured slot is a slot configured by the network device in an interval of two adjacent synchronization signal block sets.

In this embodiment, the above receiving at least one of at least two wake-up signals transmitted from the network device in the period of the synchronization signal block set, receiving the wake-up signal transmitted from the network side in the configured slot, which is a slot configured by the network device in an interval of two adjacent synchronization signal block sets, or receiving at least one of wake-up signals transmitted from the network device in the period of at least one of two adjacent synchronization signal block sets and in the configured slot may include receiving the wake-up signal transmitted from the network device on the target beam.

For example, when the period of synchronous signal block set is 160 ms and the discontinuous reception period is 80 ms, there is no transmission of synchronous signal block within two discontinuous reception periods. It is possible to simultaneously transmit the wake-up signals of two discontinuous reception in the slot of the transmission of one synchronous signal block set. Alternatively, a new time-frequency resource can be defined in the transmission time interval of two synchronous signal block sets, and a wake-up signal can be transmitted using the newly defined time-frequency resource, and another wake-up signal can be transmitted using a synchronous signal block, so as to improve the transmission efficiency of the wake-up signals and improve the resource utilization. The above at least two wake-up signals can use the same or different signal parameters.

Block 302: performing blind detection on the PDCCH based on the wake-up signal.

In this embodiment of the present disclosure, the above performing blind detection on the PDCCH based on the wake-up signal may be that the UE determines whether the received wake-up signal is that belonging to itself or belonging to a UE group, at which the UE is located. When the received wake-up signal is that belonging to itself or belonging to the UE group, at which the UE is located, the UE performs the blind detection on the PDCCH.

Optionally, the wake-up signal may include a target sequence. So, the wake-up signal can be transmitted in the form of a sequence, thus the UE can accurately distinguish whether the received wake-up signal is that belonging to itself or belonging to the UE group, at which the UE is located via the target sequence, which improves the accuracy of instructing the UE to perform the blind detection on the PDCCH, and reduces the energy consumption of the UE.

In this embodiment, the target sequence can be a Pseudo-Noise (PN) sequence, including: a maximum linear feedback shift register sequence (M sequence) or a Recombinding Sequence (RS) Sequence, etc. The target sequence can also be a sequence derived from the PN sequence, including the Gold sequence proposed by R. Gold on the basis of the M sequence. The target sequence can also include a Constant Amplitude Zero Auto Correlation (CAZAC) sequence, including a multiphase orthogonal sequence and Zadoff-Chu (ZC) sequence proposed by Zadoff and Chu.

Further, optionally, the target sequence may include: the maximum linear feedback shift register sequence, a Gold sequence or ZC sequence. Alternatively, the target sequence may include: a sequence, which is generated by modulating at least two of the maximum linear feedback shift register sequence, Gold sequence and ZC sequence. Alternatively, the target sequence may include a sequence associated with a cell Identifier (ID).

In this embodiment, the wake-up signal is transmitted through the M sequence, Gold sequence, ZC sequence or a sequence, which is generated by modulating at least two of the M sequence, Gold sequence and ZC sequence or via the sequence associated with the cell ID. So, this method may more accurately to make the UE distinguish whether the received wake-up signal is that belonging to itself, further improve the accuracy of instructing the UE to perform the blind detection on the PDCCH and reduce the energy consumption of the UE. The above sequence associated with the cell ID can be a sequence configured with the address of the cell or the address of the virtual cell.

Further, optionally, before the block 301, the method further includes: receiving configuration information transmitted from the network device. The configuration information includes: at least one of a generator polynomial, initial state, root sequence, cyclic shift and time to receive the wake-up signal.

The block 302 further includes: performing the blind detection on the PDCCH based on the configuration information and the wake-up signal.

In this embodiment, the configuration information transmitted from the network device may be received before the network device transmits a paging signal to the UE in a Radio Resource Control (RRC) idle state or before the network device transmits the PDCCH signal to the UE in a Discontinuous Reception (DRX) state. During the UE receives the wake-up signal, the network device transmits the configuration information to the UE and transmits the predefined length of M sequence to the UE according to a predefined mode, i.e. the communication protocol preset for the network device and the UE or a preconfigured mode, to configure the configuration information for the UE. The predefined length may be 31, 63 or 127 sub-carriers. Transmitting the predefined length of M sequence by the network device may include transmitting the predefined length of M sequence on OFDM symbols, at which the SSS of the synchronization signal block is located, or on idle OFDM symbols of the slot, at which the synchronization signal block is located.

Performing the blind detection on the PDCCH based on the configuration information and the wake-up signal may be that the UE performs matching detection, such as coherent detection or non-coherent detection on the received signal based on the predefined or preconfigured configuration information during the transmission time of the wake-up signal. The configuration information may include a generator polynomial, initial state, root sequence and cyclic shift. When the matching is successfully, it may be determined that the target sequence exists in the wake-up signal and determined that the wake-up signal received by the UE is that belonging to itself or belonging to the UE group, at which the UE is located. Therefore, the blind detection is performed on the PDCCH to improve the efficiency of the blind detection.

Further, when the network device transmits the target sequence in the sequence mode, the network device may generate the sequence according to the generation mode of each target sequence and transmits the sequence. This embodiment of the present disclosure describes the Gold sequence, M sequence and a generation mode formed by modulating the Gold sequence and M sequence. Since the Gold sequence is generated by performing an XOR operation on two M sequences. The generation mode of the Gold sequence may be as follows:

$$d_1(n)=1-2c(n),$$

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2,$$

M denotes length of Gold sequence c(n), $N_C=1600$;

The initialization mode of $x_1$ is $x_1(0)=1$; $x_1(n)=0$, n=1, 2, ..., 30;

The initialization mode of $x_2$ is $c_{init}=(n_s+1)\cdot(2N_{ID}^{cell}+1)\cdot 2^{16}$; $n_s$ denotes number of slots and $N_{ID}^{cell}$ denotes an address of a cell or an address of a virtual cell.

The generation mode of M sequence includes:

$$d_2(n)=1-2x((n+m) \bmod M),$$

Where, m denotes a cyclic displacement of the M sequence, and the cyclic displacement can be a cyclic displacement configured by the network side equipment for each UE or each group of UEs.

Therefore, the mode for generating the sequence by modulating the Gold sequence and the M sequence is as follows:

$$d(n)=d_1(n)\cdot d_2(n).$$

Further, this embodiment further describes the mode for generating the target sequence by modulating 3 M sequences. The mode for generating the sequence by modulating 3 M sequences is as follows:

$$d(n)=c(n)\cdot d_1(n)\cdot d_2(n)\cdot d_3(n).$$

The mode for generating $d_1(n)$ is as follows:

$$d_1(n)=1-2x(m),$$

$$m=(n+43N_{ID}^{(2)}) \bmod 127,$$

and $0 \leq n < 127$; $N_{ID}^{(1)} \in \{0, 1, \ldots, 335\}$;

$$x(i+7)=(x(i+4)+x(i)) \bmod,$$

and $$[x(6)x(5)x(4)x(3)x(2)x(1)x(0)]=[1\ 1\ 1\ 0\ 1\ 1\ 0].$$

The mode for generating $d_2(n)$ is as follows:

$$d_2(n) = 1 - 2x_0((n + m_0) \bmod 127);$$

$$m_0 = 3\left\lfloor \frac{N_{ID}^{(1)}}{112} \right\rfloor + N_{ID}^{(2)},$$

and $N_{ID}^{(2)} \in \{0, 1, 2\}$; further, $N_{ID}^{cell} = 3N_{ID}^{(1)} + N_{ID}^{(2)}$.

The mode for generating $d_3(n)$ is as follows:

$$d_3(n)=1-2x_1((n+m_1) \bmod 127),$$

$$m_1=(N_{ID}^{(1)} \bmod 112)+m_0+1.$$

Further, c(n) denotes a scrambling sequence, in which the element is ±1. The network device may configure a scrambling sequence for each UE or each group of UEs.

Optionally, the above block 301 may include: receiving the wake-up signal transmitted from the network device on predefined or preconfigured time frequency resources. Therefore, the UE may accurately determine whether the received wake-up signal is that belonging to itself, which may improve the accuracy of the blind detection performed by the UE on the PDCCH and reduce the energy consumption of the UE.

In this embodiment, receiving the wake-up signal transmitted by the network device on the predefined or preconfigured time-frequency resources may be receiving the wake-up signal transmitted from the network device at a moment corresponding to a synchronization signal block in the predefined or preconfigured time-frequency resources; receiving the wake-up signal transmitted from the network device in a bandwidth corresponding to the synchronization signal block in the predefined or preconfigured time-frequency resources; or receiving the wake-up signal transmitted from the network device at the moment corresponding to the synchronization signal block and in the bandwidth corresponding to the synchronization signal block in the predefined or preconfigured time-frequency resources.

Further, optionally, the block 302 may further include:

when the wake-up signal transmitted from the network device is correctly decoded, making a determination that the wake-up signal transmitted from the network device is received, performing the blind detection on the PDCCH or maintaining the sleep state when the PDCCH is detected, the wake-up signal is a wake-up signal, which is predefined or preconfigured on the time frequency resources, encoded and scrambled by the network device; or when detecting that power of the wake-up signal transmitted from the network device is larger than a preset threshold, making a determination that the wake-up signal transmitted from the network device is received, performing the blind detection on the PDCCH or maintaining the sleep state when the PDCCH is detected, wherein the wake-up signal is the wake-up signal, which is predefined or preconfigured on the time frequency resources and is obtained after the network device modulates the amplitude of the wake-up signal, and the power of the wake-up signal is associated with the modulated amplitude.

Before the network device transmits the paging signal to the UE in the RRC idle state or before the network device transmits the PDCCH signal to the UE in the DRX state, the network device may encode or scramble the wake-up signal on the predefined or preconfigured time-frequency resources. When the UE receives the encoded or scrambled target information, the UE decodes the wake-up signal. When the UE may correctly decodes the wake-up signal, the UE may determine that the wake-up signal belonging to itself is received, that is, the UE receives the wake-up signal transmitted from the network device. When the UE cannot correctly decode the wake-up signal, the UE determines that it does not receive the wake-up signal transmitted from the network device. Therefore, the accuracy of instructing the UE to perform the blind detection on the PDCCH is improved and the energy consumption of the UE is reduced.

Further, the network device may modulate the amplitude of the wake-up signal on the predefined or preconfigured time-frequency resources. For instance, the amplitude of the wake-up signal may be modulated to a preset amplitude. When the UE receives the target information, the amplitude of which has been modulated, the UE detects whether the power of the received wake-up signal transmitted from the network device is larger than a preset threshold. When detecting that the power of the received wake-up signal transmitted from the network device is larger than the preset threshold, it is determined that the wake-up signal transmitted from the network device is received. Therefore, the energy consumption of the UE may be reduced. The association between the power of the wake-up signal and the amplitude of the wake-up signal may be the corresponding relationship between the preset power and the amplitude. The power of the wake-up signal associated with the amplitude of the wake-up signal may be determined according to the corresponding relationship between the preset power and the amplitude.

It should be noted that the above-mentioned receiving, by the UE, the wake-up signal transmitted from the network device may include receiving the wake-up signal transmitted from the network device on the idle resources or idle OFDM resources in the mode of the target sequence, or transmitted from the network device in the mode of coding and scrambling or in the mode of amplitude modulation on the predefined or preconfigured time-frequency resources, or receiving the wake-up signal in the mode of the target sequence when the UE performs the radio management measurement, or in the mode of coding and scrambling or in the mode of amplitude modulation on the predefined or preconfigured time-frequency resources, or receiving the wake-up signal in the mode of the target sequence on the target beam, or in the mode of coding and scrambling or in the mode of amplitude modulation on the predefined or preconfigured time-frequency resources, which are not limited here.

This embodiment of the present disclosure receives the wake-up signal transmitted from the network device, and the wake-up signal is used to wake up the UE to perform the blind detection on the PDCCH. The blind detection is performed on the PDCCH based on the wake-up signal. The UE can conduct the blind detection after receiving the wake-up signal transmitted from the network device, so as to avoid the periodic blind detection performed by the UE on the PDCCH, thus reduce the energy consumption of the UE.

Figure 4:
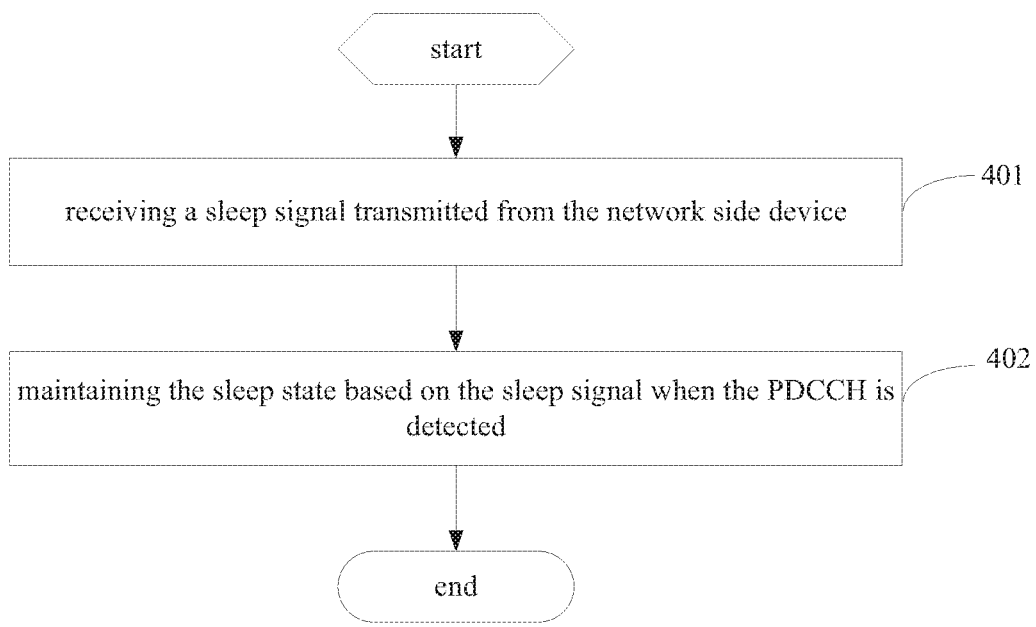
FIG. 4 is a flow chart illustrating another blind detection method in accordance with various embodiments of the present disclosure.

Referring to FIG. 4, FIG. 4 is a flow chart illustrating a blind detection method in accordance with various embodiments of the present disclosure. As shown in FIG. 4, the embodiment of the present disclosure is described taking the target signal as the sleep signal and includes following blocks:

Block 401: receiving a sleep signal transmitted from the network device.

In embodiments of the present disclosure, the above receiving the sleep signal includes receiving the sleep signal transmitted from the network device when the UE performs the detection on the PDCCH in the RRC idle state or DRX state. After the UE receives the sleep signal transmitted from the network device, the UE maintains the sleep state.

Optionally, the above block 401 may include: receiving the sleep signal transmitted from the network device at a moment corresponding to a synchronization signal block; receiving the sleep signal transmitted from the network device in a bandwidth corresponding to the synchronization signal block; or receiving the sleep signal transmitted from the network device at the moment corresponding to the synchronization signal block and in the bandwidth corresponding to the synchronization signal block. Receiving the sleep signal at the moment corresponding to the synchronization signal block or in the bandwidth corresponding to the synchronization signal block may effectively save resources occupied for transmitting and receiving the sleep signal and improve resource utilization of the synchronization signal block.

Further, optionally, the step of receiving the sleep signal transmitted from the network device at the moment corresponding to the synchronization signal block includes: receiving the sleep signal, which is transmitted from the network device on idle resources of Orthogonal Frequency Division Multiplexing (OFDM) symbols, at which a primary synchronization signal included in the synchronization signal block is located; or receiving the sleep signal, which is transmitted from the network device on idle resources of OFDM symbols, at which a secondary synchronization signal included in the synchronization signal block is located; or receiving the sleep signal, which is transmitted from the network device on the idle resources of the OFDM symbols, at which the primary synchronization signal included in the synchronization signal block is located and on the idle resources of the OFDM symbols, at which the secondary synchronization signal included in the synchronization signal block is located; or receiving the sleep signal, which is transmitted from the network device on idle OFDM symbols of a slot, at which the synchronization signal block is located; or receiving the sleep signal, which is transmitted from the network device on all or partial of idle resources of the synchronization signal block. Through transmitting the sleep signal in the idle resources or idle OFDM symbols, the resource utilization of the synchronization signal block may be further improved.

Further, optionally, the step of receiving the sleep signal from the network device in the bandwidth corresponding to the synchronization signal block includes: receiving the sleep signal transmitted from the network device on partial or all sub-carriers for transmitting the synchronization signal block. Through transmitting the sleep signal on partial or all sub-carriers for transmitting the synchronization signal block, the resource utilization of the synchronization signal block may be further improved.

The idle resources include resources in resources occupied by the synchronization signal block except for those occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Optionally, the block 401 may include: receiving the sleep signal transmitted from the network device when the UE performs the radio resource management measurement. The UE may receive the sleep signal transmitted from the network device when the UE performs the radio resource management measurement, which may avoid that the resources are occupied when the UE performs the radio resource management measurement and may reduce the energy consumption of the UE.

Receiving the sleep signal transmitted from the network device when the UE performs the radio resource management measurement may include receiving the sleep signal transmitted from the network device when the UE performs the radio resource management measurement and in the idle resources or idle OFDM symbols.

This embodiment of the present disclosure, receiving the sleep signal transmitted from the network device may be receiving the sleep signal transmitted from the network device on beams except for those used for transmitting the synchronization signal block. In an alternative, optionally, the block 401 may include: receiving the sleep signal transmitted from the network device on a target beam. The target beam is a beam used by the network device for transmitting the synchronization signal block. By transmitting the sleep signal on the target beam, resources occupied for transmitting the sleep signal may be reduced and resource utilization of the network device and the UE may be further improved.

In this embodiment, the above receiving the sleep signal transmitted from the network device on the target beam may include receiving the sleep signal transmitted from the network device on the target beam and when the UE performs the radio resource management measurement.

Optionally, the block 401 may include:

when a period of a synchronization signal block set is larger than a discontinuous reception period of the UE, receiving at least one of at least two sleep signals transmitted from the network device in the period of the synchronization signal block set; or when the period of the synchronization signal block set is larger than the discontinuous reception period of the UE, receiving the sleep signal transmitted from the network device in a configured slot; or when the period of the synchronization signal block set is larger than the discontinuous reception period of the UE, receiving at least one of sleep signals transmitted from the network device in the period of at least one of two adjacent synchronization signal block sets and in the configured slot;

wherein the configured slot is a slot configured by the network device in an interval of two adjacent synchronization signal block sets.

In this embodiment, the above receiving at least one of at least two sleep signals transmitted from the network device in the period of the synchronization signal block set, receiving the sleep signal transmitted from the network side in the configured slot, which is a slot configured by the network device in an interval of two adjacent synchronization signal block sets, or receiving at least one of sleep signals transmitted from the network device in the period of at least one of two adjacent synchronization signal block sets and in the configured slot may include receiving the sleep signal transmitted from the network device on the target beam.

Block 402: maintaining the sleep state based on the sleep signal when the PDCCH is detected.

In this embodiment of the present disclosure, the above performing the blind detection on the PDCCH based on the sleep signal may be that the UE determines whether the received sleep signal is that belonging to itself or that belonging to a UE group, at which the UE is located. When the received sleep signal is that belonging to itself or that belonging to the UE group, at which the UE is located, the UE maintains the sleep state when the PDCCH is detected.

Optionally, the sleep signal may include a target sequence. So, the sleep signal can be transmitted in the form of sequence, thus the UE can accurately distinguish whether the received sleep signal is that belonging to itself or that belonging to the UE group, at which the UE is located, via the target sequence. Thus, the accuracy of instructing the UE to perform the blind detection on the PDCCH is improved, and the energy consumption of the UE is reduced.

Further, optionally, the target sequence may include: the maximum linear feedback shift register sequence, a Gold sequence or ZC sequence. Alternatively, the target sequence may include: a sequence, which is generated by modulating at least two of the maximum linear feedback shift register sequence, Gold sequence and ZC sequence. Alternatively, the target sequence may include a sequence associated with a cell Identifier (ID). Further, the periodic blind detection performed by the UE on the PDCCH may be avoided and the energy consumption of the UE may be reduced.

Further, optionally, before the block 401, the method further includes: receiving configuration information from the network device. The configuration information includes: at least one of a generator polynomial, initial state, root sequence, cyclic shift and time to receive the target signal. The block 402 further includes: maintaining the sleep state based on the configuration information and the sleep signal when the PDCCH is detected. Therefore, it may be rapidly and accurately determined whether the received sleep signal is that belonging to itself or that belonging to a UE group, at which the UE is located, the efficiency of the blind detection may be improved and the energy consumption of the UE may be reduced.

Optionally, the above block 401 may include: receiving the sleep signal transmitted from the network device on predefined or preconfigured time frequency resources. Therefore, the UE may accurately determine whether the received sleep signal is that belonging to itself, which may avoid the periodic blind detection performed by the UE on the PDCCH, thus reduce the energy consumption of the UE.

In this embodiment, receiving the sleep signal transmitted by the network device on the predefined or preconfigured time-frequency resources may include receiving the sleep signal transmitted from the network device at a moment corresponding to a synchronization signal block in the predefined or preconfigured time-frequency resources; receiving the sleep signal transmitted from the network device in a bandwidth corresponding to the synchronization signal block in the predefined or preconfigured time-frequency resources; or receiving the sleep signal transmitted from the network device at the moment corresponding to the synchronization signal block and in the bandwidth corresponding to the synchronization signal block in the predefined or preconfigured time-frequency resources, which is not limited here.

Further, optionally, performing the blind detection on the PDCCH or maintaining the sleep state based on the sleep signal when the PDCCH is detected may include:

when the sleep signal transmitted from the network device is correctly decoded, making a determination that the sleep signal transmitted from the network device is received, performing the blind detection on the PDCCH or maintaining the sleep state when the PDCCH is detected, the sleep signal is a sleep signal, which is predefined or preconfigured on the time frequency resources and encoded and scrambled by the network device; or when detecting that power of the sleep signal transmitted from the network device is larger than a preset threshold, making a determination that the sleep signal transmitted from the network device is received, performing the blind detection on the PDCCH or maintaining the sleep state when the PDCCH is detected, wherein the sleep signal is the sleep signal, which is predefined or preconfigured on the time frequency resources and is obtained after the network device modulates the amplitude of the sleep signal, and the power of the sleep signal is associated with the modulated amplitude.

It should be noted that the above-mentioned receiving, by the UE, the sleep signal transmitted from the network device may include receiving the sleep signal transmitted from the network device on the idle resources or idle OFDM resources in the mode of the target sequence, or transmitted from the network device on the predefined or preconfigured time-frequency resources in the mode of coding and scrambling or in the mode of amplitude modulation, or receiving the sleep signal in the mode of the target sequence when the UE performs the radio management measurement, or in the mode of coding and scrambling or in the mode of amplitude modulation on the predefined or preconfigured time-frequency resources, or receiving the sleep signal in the mode of the target sequence on the target beam, or in the mode of coding and scrambling or in the mode of amplitude modulation on the predefined or preconfigured time-frequency resources, which are not limited here.

This embodiment of the present disclosure includes: receiving the sleep signal transmitted from the network device and maintaining the sleep state based on the sleep signal when the PDCCH is detected. The periodic blind detection performed by the UE on the PDCCH may be avoided and the energy consumption of the UE may be reduced.

Figure 5:
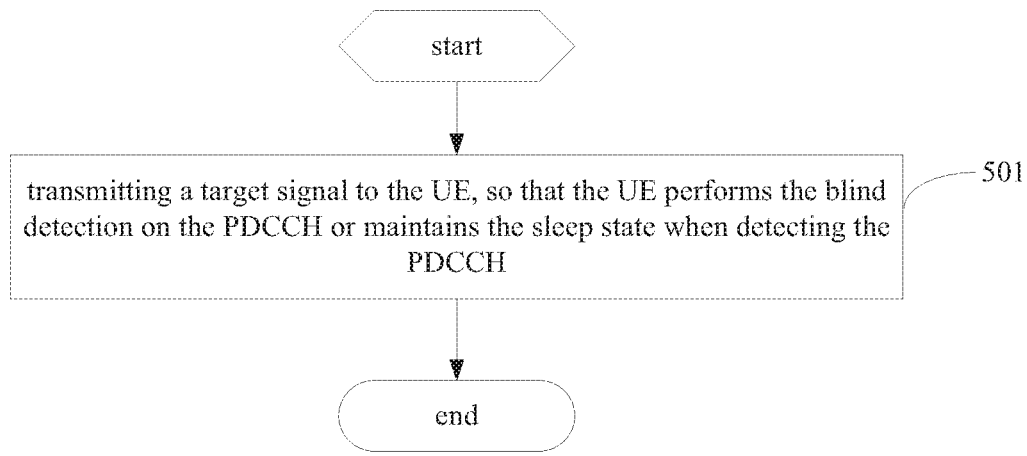
FIG. 5 is a flow chart illustrating a signal transmission method in accordance with various embodiments of the present disclosure.

Referring to FIG. 5, FIG. 5 is a flow chart illustrating a signal transmission method in accordance with various embodiments of the present disclosure. The method is applied to the network device, as shown in FIG. 5, the method includes:

Block 501: transmitting a target signal to the UE, so that the UE performs the blind detection on the PDCCH or maintains the sleep state when the PDCCH is detected.

It should be noted that the above method may be applied to the network device in the system shown in FIG. 1.

This embodiment of the present disclosure transmits the target signal to the UE, so that the UE performs the blind detection on the PDCCH or maintains the sleep state when the PDCCH is detected. The periodic blind detection performed by the UE on the PDCCH may be avoided and the energy consumption of the UE may be reduced.

Figure 6:
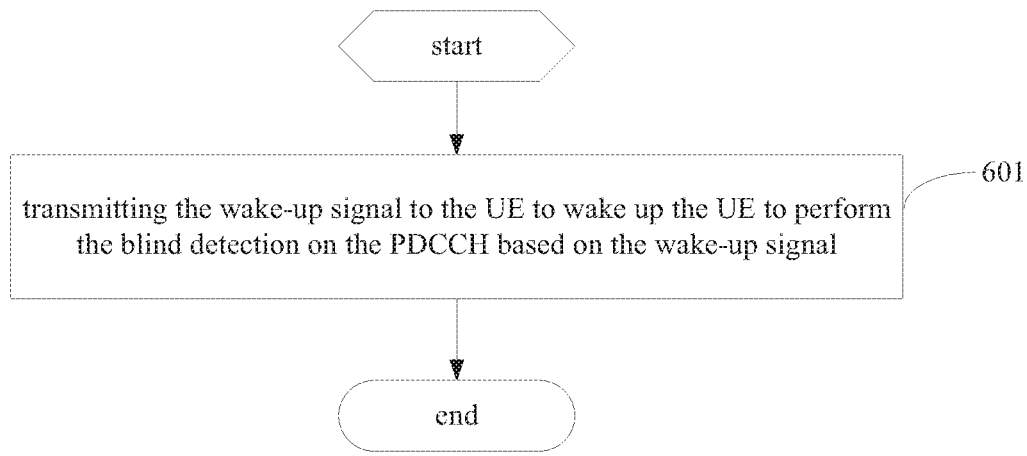
FIG. 6 is a flow chart illustrating another signal transmission method in accordance with various embodiments of the present disclosure.

Referring to FIG. 6, FIG. 6 is a flow chart illustrating a signal transmission method in accordance with various embodiments of the present disclosure. As shown in FIG. 6, this embodiment of the present disclosure is described taking the target signal as the wake-up signal and includes following blocks:

Block 601: transmitting the wake-up signal to the UE to wake up the UE to perform the blind detection on the PDCCH based on the wake-up signal.

Optionally, the wake-up signal may include a target sequence.

Further, optionally, the target sequence includes:

a maximum linear feedback shift register sequence, a Gold sequence or Zadoff-Chu (ZC) sequence; or the target sequence includes:

a sequence, which is generated by modulating at least two of the maximum linear feedback shift register sequence, Gold sequence and ZC sequence; or the target sequence includes: a sequence associated with a cell Identifier (ID).

Further, optionally, before block 601, the method further includes:

transmitting configuration information to the UE. The configuration information includes: at least one of a generator polynomial, initial state, root sequence, cyclic shift and time to receive the wake-up signal.

Optionally, the block 601 may include:

transmitting the wake-up signal to the UE when the UE performs radio resource management measurement.

Optionally, the block 601 may include:

transmitting the wake-up signal to the UE at a moment corresponding to a synchronization signal block;

transmitting the wake-up signal to the UE in a bandwidth corresponding to the synchronization signal block; or transmitting the wake-up signal to the UE at the moment corresponding to the synchronization signal block and in the bandwidth corresponding to the synchronization signal block.

Further, optionally, the step of transmitting the wake-up signal to the UE at the moment corresponding to the synchronization signal block includes:

transmitting the wake-up signal to the UE on idle resources of Orthogonal Frequency Division Multiplexing (OFDM) symbols, at which a secondary synchronization signal included in the synchronization signal block is located; or transmitting the wake-up signal to the UE on idle resources of OFDM symbols, at which a primary synchronization signal included in the synchronization signal block is located; or transmitting the wake-up signal to the UE on the idle resources of the OFDM symbols, at which the primary synchronization signal included in the synchronization signal block is located and on the idle resources of the OFDM symbols, at which the secondary synchronization signal included in the synchronization signal block is located; or transmitting the wake-up signal to the UE on idle OFDM symbols of a slot, at which the synchronization signal block is located; or transmitting the wake-up signal to the UE on all or partial of idle resources of the synchronization signal block.

The idle resources include resources in resources occupied by the synchronization signal block except for those occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Further, optionally, the step of transmitting the wake-up signal to the UE in the bandwidth corresponding to the synchronization signal block includes:

transmitting the wake-up signal to the UE on partial or all sub-carriers for transmitting the synchronization signal block.

Optionally, the block 601 may include:

transmitting the wake-up signal to the UE on predefined or preconfigured time frequency resources.

Optionally, the step of transmitting the wake-up signal to the UE on predefined or preconfigured time frequency resources includes:

encoding and scrambling the wake-up signal and transmitting the encoded and scrambled wake-up signal to the UE on the predefined or preconfigured time frequency resources;

modulating amplitude of the wake-up signal and transmitting the wake-up signal, the amplitude of which has been modulated, to the UE on the predefined or preconfigured time frequency resources.

Optionally, the block 601 may include:

when a period of a synchronization signal block set is larger than a discontinuous reception period of the UE, transmitting at least two wake-up signals to the UE in the period of the synchronization signal block; or when the period of the synchronization signal block set is larger than the discontinuous reception period of the UE, configuring a slot in an interval between two adjacent synchronization signal block sets and transmitting the wake-up signal in the configured slot; or when the period of the synchronization signal block set is larger than the discontinuous reception period of the UE, configuring the slot in the interval between two adjacent synchronization signal block sets and transmitting the wake-up signal in a period of at least one of adjacent synchronization signal block sets and in the configured slot.

Optionally, the block 601 may include:

receiving the wake-up signal transmitted from the network device on a target beam, wherein the target beam is a beam used by the network device for transmitting the synchronization signal block.

In this embodiment, multiple optional embodiments are increased on the basis of the embodiments shown in FIG. 5 and all of these optional embodiments may wake up the UE to perform the blind detection on the PDCCH based on the wake-up signal, so as to avoid the periodic blind detection performed by the UE on the PDCCH, thus reduce the energy consumption of the UE.

Figure 7:
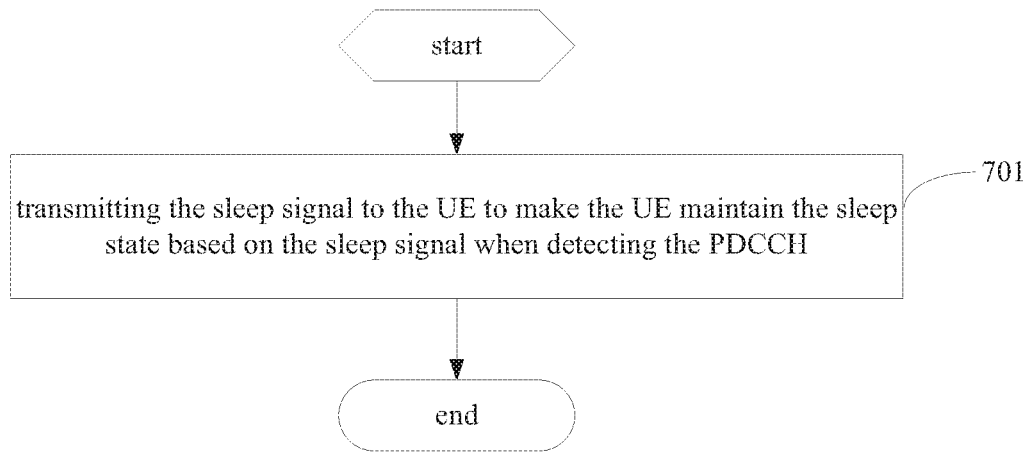
FIG. 7 is a flow chart illustrating another signal transmission method in accordance with various embodiments of the present disclosure.

Referring to FIG. 7, FIG. 7 is a flow chart illustrating a signal transmission method in accordance with various embodiments of the present disclosure. As shown in FIG. 7, this embodiment of the present disclosure is described taking the target signal as the sleep signal and includes following blocks:

Block 701: transmitting the sleep signal to the UE to make the UE maintain the sleep state based on the sleep signal when the PDCCH is detected.

Optionally, the sleep signal may include a target sequence.

Further, optionally, the target sequence includes:

a maximum linear feedback shift register sequence, a Gold sequence or Zadoff-Chu (ZC) sequence; or the target sequence includes:

a sequence, which is generated by modulating at least two of the maximum linear feedback shift register sequence, Gold sequence and ZC sequence; or the target sequence includes: a sequence associated with a cell Identifier (ID).

Further, optionally, before block 701, the method further includes:

transmitting configuration information to the UE. The configuration information includes: at least one of a generator polynomial, initial state, root sequence, cyclic shift and time to receive the sleep signal.

Optionally, the block 701 may include:

transmitting the sleep signal to the UE when the UE performs radio resource management measurement.

Optionally, the block 701 may include:

transmitting the sleep signal to the UE at a moment corresponding to a synchronization signal block;

transmitting the sleep signal to the UE in a bandwidth corresponding to the synchronization signal block; or transmitting the sleep signal to the UE at the moment corresponding to the synchronization signal block and in the bandwidth corresponding to the synchronization signal block.

Further, optionally, the step of transmitting the sleep signal to the UE at the moment corresponding to the synchronization signal block includes:

transmitting the sleep signal to the UE on idle resources of Orthogonal Frequency Division Multiplexing (OFDM) symbols, at which a secondary synchronization signal included in the synchronization signal block is located; or transmitting the sleep signal to the UE on idle resources of OFDM symbols, at which a primary synchronization signal included in the synchronization signal block is located; or transmitting the sleep signal to the UE on the idle resources of the OFDM symbols, at which the primary synchronization signal included in the synchronization signal block is located and on the idle resources of the OFDM symbols, at which the secondary synchronization signal included in the synchronization signal block is located; or transmitting the sleep signal to the UE on idle OFDM symbols of a slot, at which the synchronization signal block is located; or transmitting the sleep signal to the UE on all or partial of idle resources of the synchronization signal block.

The idle resources include resources in resources occupied by the synchronization signal block except for those occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Further, optionally, the step of transmitting the sleep signal to the UE in the bandwidth corresponding to the synchronization signal block includes:

transmitting the sleep signal to the UE on partial or all sub-carriers for transmitting the synchronization signal block.

Optionally, the block 701 may include:

transmitting the sleep signal to the UE on predefined or preconfigured time frequency resources.

Optionally, the step of transmitting the sleep signal to the UE on predefined or preconfigured time frequency resources includes:

encoding and scrambling the sleep signal and transmitting the encoded and scrambled sleep signal to the UE on the predefined or preconfigured time frequency resources;

modulating the amplitude of the sleep signal and transmitting the sleep signal, the amplitude of which has been modulated, to the UE on the predefined or preconfigured time frequency resources.

Optionally, the block 701 may include:

when a period of a synchronization signal block set is larger than a discontinuous reception period of the UE, transmitting at least two sleep signals to the UE in the period of the synchronization signal block; or when the period of the synchronization signal block set is larger than the discontinuous reception period of the UE, configuring a slot in an interval between two adjacent synchronization signal block sets and transmitting the sleep signal in the configured slot; or when the period of the synchronization signal block set is larger than the discontinuous reception period of the UE, configuring the slot in the interval between two adjacent synchronization signal block sets and transmitting the sleep signal in a period of at least one of adjacent synchronization signal block sets and in the configured slot.

Optionally, the block 701 may include:

receiving the sleep signal transmitted from the network device on a target beam, wherein the target beam is a beam used by the network device for transmitting the synchronization signal block.

In this embodiment, multiple optional embodiments are increased on the basis of the embodiment shown in FIG. 5 and all of these optional embodiments may make the UE maintain the sleep state based on the sleep signal when the PDCCH is detected, so as to avoid the periodic blind detection performed by the UE on the PDCCH, thus reduce the energy consumption of the user terminal.

Figure 8:
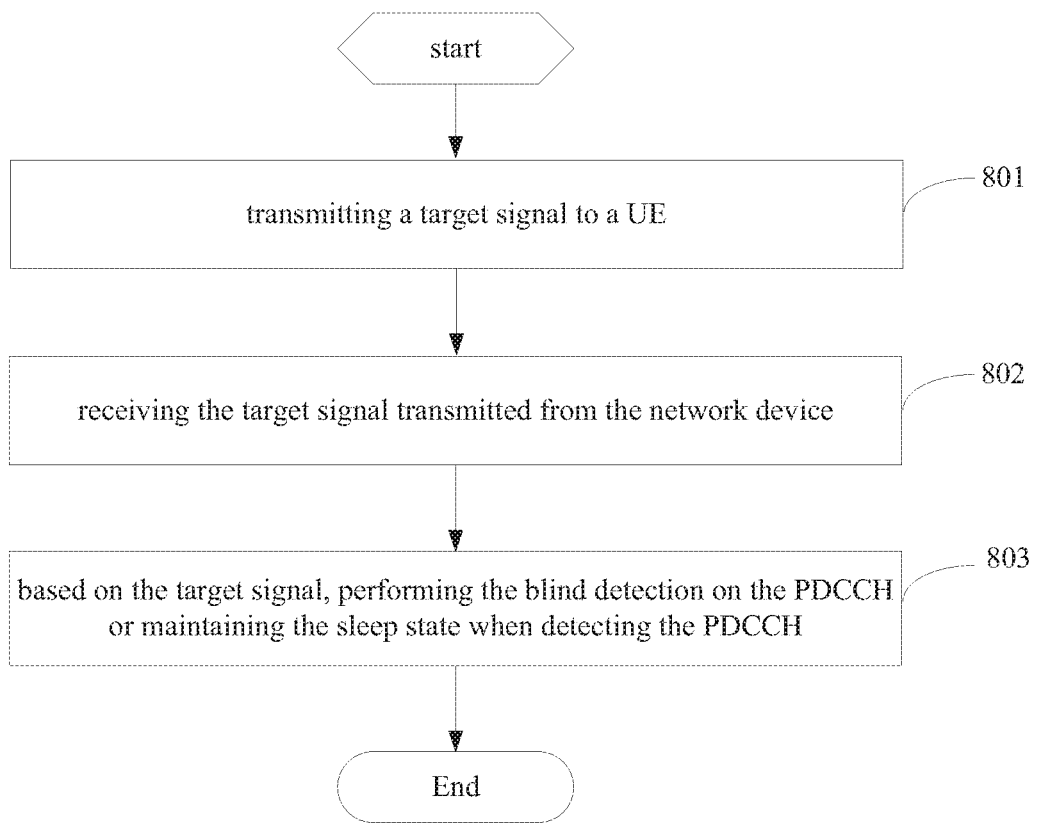
FIG. 8 is a flow chart illustrating a signal transmission method in accordance with various embodiments of the present disclosure.

Referring to FIG. 8, FIG. 8 is a flow chart illustrating a signal transmission method in accordance with various embodiments of the present disclosure. As shown in FIG. 8, the method includes following blocks:

Block 801: transmitting a target signal to a User Equipment (UE), to make the UE perform blind detection on Physical Downlink Control Channel (PDCCH) or maintain a sleep state when the PDCCH is detected.

Block 802: receiving the target signal transmitted from the network device.

Block 803: performing the blind detection on the PDCCH or maintaining the sleep state based on the target signal when the PDCCH is detected.

With the above blocks, the periodic blind detection performed by the UE on the PDCCH may be avoided, thus the energy consumption of the UE is reduced.

Figure 9:
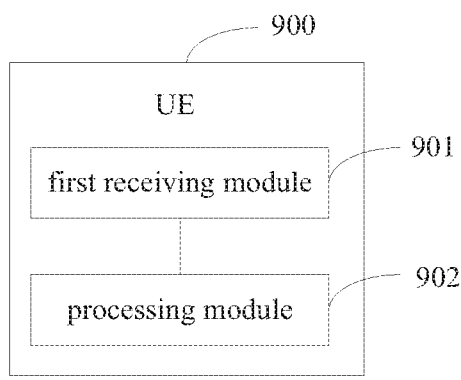
FIG. 9 is a schematic diagram illustrating structure of a UE in accordance with various embodiments of the present disclosure.

Referring to FIG. 9, FIG. 9 is a schematic diagram illustrating structure of a UE in accordance with various embodiments of the present disclosure. As shown in FIG. 9, the UE 900 includes:

a first receiving module 901, configured to receive a target signal transmitted from a network device; and a processing module 902, configured to perform blind detection on Physical Downlink Control Channel (PDCCH) or maintain a sleep state based on the target signal when the PDCCH is detected.

Optionally, the target signal includes a wake-up signal, the processing module 902 is specifically configured to perform the blind detection on the PDCCH based on the wake-up signal.

Optionally, the target signal includes a sleep signal.

The processing module 902 is specifically configured to maintain the sleep state based on the sleep signal when the PDCCH is detected.

Optionally, the target signal includes a target sequence.

Optionally, the target sequence includes: a maximum linear feedback shift register sequence, a Gold sequence or Zadoff-Chu (ZC) sequence; or the target sequence includes: a sequence, which is generated by modulating at least two of the maximum linear feedback shift register sequence, Gold sequence and ZC sequence; or the target sequence includes: a sequence associated with a cell Identifier (ID).

Figure 10:
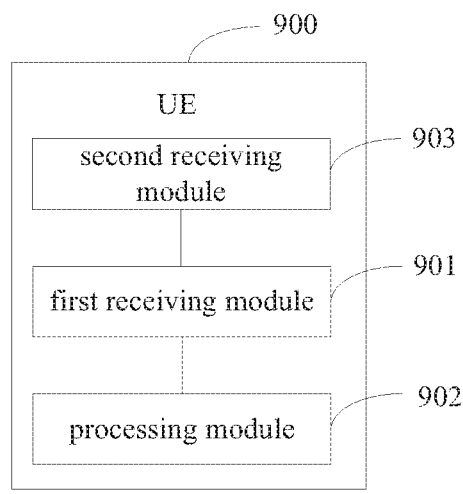
FIG. 10 is a schematic diagram illustrating structure of another UE in accordance with various embodiments of the present disclosure.

Optionally, as shown in FIG. 10, the UE 900 further includes:

a second receiving module 903, configured to receive configuration information transmitted from the network device. The configuration information includes: at least one of a generator polynomial, initial state, root sequence, cyclic shift and time to receive the target signal.

The processing module 902 is specifically configured to perform the blind detection on the PDCCH or maintain the sleep state based on the configuration information and the target information when the PDCCH is detected.

Optionally, the first receiving module 901 is specifically configured to receive the target signal transmitted from the network device when the UE performs radio resource management measurement.

Optionally, the first receiving module 901 is specifically configured to receive the target signal transmitted from the network device at a moment corresponding to a synchronization signal block; or the first receiving module 901 is specifically configured to receive the target signal transmitted from the network device in a bandwidth corresponding to the synchronization signal block; or the first receiving module 901 is specifically configured to receive the target signal transmitted from the network device at the moment corresponding to the synchronization signal block and in the bandwidth corresponding to the synchronization signal block.

Optionally, the first receiving module 901 is specifically configured to receive the target signal, which is transmitted from the network device on idle resources of Orthogonal Frequency Division Multiplexing (OFDM) symbols, at which a primary synchronization signal included in the synchronization signal block is located; or the first receiving module 901 is specifically configured to receive the target signal, which is transmitted from the network device on idle resources of OFDM symbols, at which a secondary synchronization signal included in the synchronization signal block is located; or the first receiving module 901 is specifically configured to receive the target signal, which is transmitted from the network device on the idle resources of the OFDM symbols, at which the primary synchronization signal included in the synchronization signal block is located and on the idle resources of the OFDM symbols, at which the secondary synchronization signal included in the synchronization signal block is located; or the first receiving module 901 is specifically configured to receive the target signal, which is transmitted from the network device on idle OFDM symbols of a slot, at which the synchronization signal block is located; or the first receiving module 901 is specifically configured to receive the target signal, which is transmitted from the network device on all or partial of idle resources of the synchronization signal block.

The idle resources include resources in resources occupied by the synchronization signal block except for resources occupied by the primary synchronization signal, secondary synchronization signal, physical broadcast channel signal and physical broadcast channel demodulation reference signal; the idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Optionally, the first receiving module 901 is specifically configured to receive the target signal transmitted from the network device on partial or all sub-carriers for transmitting the synchronization signal block.

Optionally, the first receiving module 901 is specifically configured to receive the target signal transmitted from the network device on predefined or preconfigured time frequency resources.

Optionally, the processing module 902 is specifically configured to, when the target signal transmitted from the network device is correctly decoded, make a determination that the target signal transmitted from the network device is received, perform the blind detection on the PDCCH or maintain the sleep state when the PDCCH is detected, wherein the target signal is a target signal, which is predefined or preconfigured on the time frequency resources, and encoded and scrambled by the network device; or the processing module 902 is specifically configured to, when detecting that power of the target signal transmitted from the network device is larger than a preset threshold, make a determination that the target signal transmitted from the network device is received, perform the blind detection on the PDCCH or maintain the sleep state when the PDCCH is detected, wherein the target signal is the target signal, which is predefined or preconfigured on the time frequency resources and is obtained after amplitude of the target signal is modulated by the network device, and the power of the target signal is associated with the modulated amplitude.

Optionally, the first receiving module 901 is specifically configured to, when a period of a synchronization signal block set is larger than a discontinuous reception period of the UE, receive at least one of at least two target signals transmitted from the network device in the period of the synchronization signal block set; or the first receiving module 901 is specifically configured to, when the period of the synchronization signal block set is larger than the discontinuous reception period of the UE, receive the target signal transmitted from the network device in a configured slot; or the first receiving module 901 is specifically configured to, when the period of the synchronization signal block set is larger than the discontinuous reception period of the UE, receive at least one of target signals transmitted from the network device in the period of at least one of two adjacent synchronization signal block sets and in the configured slot.

The configured slot is a slot configured by the network device in an interval of two adjacent synchronization signal block sets.

Optionally, the first receiving module 901 is specifically configured to receive the target signal transmitted from the network device on a target beam, wherein the target beam is a beam used by the network device for transmitting the synchronization signal block.

It should be noted that the above UE 900 in this embodiment may be the UE of any embodiment in method embodiments of the present disclosure. Any implementation modes of the UEs in the method embodiments of the present disclosure may be implemented by the above UE 900 in this embodiment and same effects may be achieved, which are not repeated here.

Figure 11:
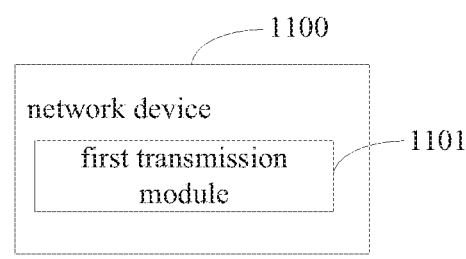
FIG. 11 is a schematic diagram illustrating structure of a network device in accordance with various embodiments of the present disclosure.

Referring to FIG. 11, FIG. 11 is a diagram illustrating structure of a network device in accordance with various embodiments of the present disclosure. As shown in FIG. 11, the network device 1100 includes:

a first transmission module 1101, configured to transmit a target signal to a User Equipment (UE), so that the UE performs blind detection on Physical Downlink Control Channel (PDCCH) or maintains a sleep state when the PDCCH is detected.

Optionally, the first transmission module 1101 is specifically configured to transmit a wake-up signal to the UE to wake up the UE to perform the blind detection on the PDCCH based on the wake-up signal.

Optionally, the first transmission module 1101 is specifically configured to transmit a sleep signal to the UE, so that the UE maintains the sleep state based on the sleep signal when the PDCCH is detected.

Optionally, the target signal includes a target sequence.

Optionally, the target sequence includes: a maximum linear feedback shift register sequence, Gold sequence or Zadoff-Chu (ZC) sequence; or the target sequence includes: a sequence, which is generated by modulating at least two of the maximum linear feedback shift register sequence, Gold sequence and ZC sequence; or the target sequence includes: a sequence associated with a cell Identifier (ID).

Figure 12:
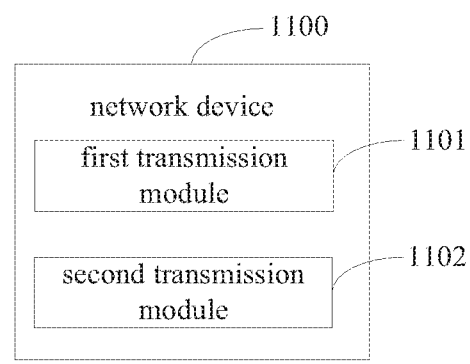
FIG. 12 is a schematic diagram illustrating structure of another network device in accordance with various embodiments of the present disclosure.

Optionally, as shown in FIG. 12, the network device further includes:

a second transmission module 1102, configured to transmit configuration information to the UE, wherein the configuration information includes: at least one of a generator polynomial, initial state, root sequence, cyclic shift and time to receive the target signal.

Optionally, the first transmission module 1101 is specifically configured to transmit the target signal to the UE when the UE performs radio resource management measurement.

Optionally, the first transmission module 1101 is specifically configured to transmit the target signal to the UE at a moment corresponding to a synchronization signal block; or the first transmission module 1101 is specifically configured to transmit the target signal to the UE in a bandwidth corresponding to the synchronization signal block; or the first transmission module 1101 is specifically configured to transmit the target signal to the UE at the moment corresponding to the synchronization signal block and in the bandwidth corresponding to the synchronization signal block.

Optionally, the first transmission module 1101 is specifically configured to transmit the target signal to the UE on idle resources of Orthogonal Frequency Division Multiplexing (OFDM) symbols, at which a primary synchronization signal included in the synchronization signal block is located; or the first transmission module 1101 is specifically configured to transmit the target signal to the UE on idle resources of OFDM symbols, at which a secondary synchronization signal included in the synchronization signal block is located; or the first transmission module 1101 is specifically configured to transmit the target signal to the UE on the idle resources of the OFDM symbols, at which the primary synchronization signal included in the synchronization signal block is located and on the idle resources of the OFDM symbols, at which the secondary synchronization signal included in the synchronization signal block is located; or the first transmission module 1101 is specifically configured to transmit the target signal to the UE on idle OFDM symbols of a slot, at which the synchronization signal block is located; or the first transmission module 1101 is specifically configured to transmit the target signal to the UE on all or partial of idle resources of the synchronization signal block.

The idle resources include resources in resources occupied by the synchronization signal block except for resources occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Optionally, the first transmission module 1101 is specifically configured to transmit the target signal to the UE on partial or all sub-carriers for transmitting the synchronization signal block.

Optionally, the first transmission module 1101 is specifically configured to transmit the target signal to the UE on predefined or preconfigured time frequency resources.

Optionally, the first transmission module 1101 is specifically configured to encode and scramble the target signal and transmit the encoded and scrambled target signal to the UE on the predefined or preconfigured time frequency resources; or the first transmission module 1101 is specifically configured to modulate the amplitude of the target signal and transmit the target signal, the amplitude of which has been modulated, to the UE on the predefined or preconfigured time frequency resources.

Optionally, the first transmission module 1101 is specifically configured to, when a period of a synchronization signal block set is larger than a discontinuous reception period of the UE, transmit at least two target signals to the UE in the period of the synchronization signal block set; or the first transmission module 1101 is specifically configured to, when the period of the synchronization signal block set is larger than the discontinuous reception period of the UE, configure a slot in an interval between two adjacent synchronization signal block sets and transmit the target signal in the configured slot; or the first transmission module 1101 is specifically configured to, when the period of the synchronization signal block set is larger than the discontinuous reception period of the UE, configure the slot in the interval between two adjacent synchronization signal block sets and transmit the target signal in a period of at least one of adjacent synchronization signal block sets and in the configured slot.

Optionally, the first transmission module 1101 is specifically configured to transmit the target signal to the UE on a target beam. The target beam is a beam used by the network device for transmitting the synchronization signal block.

It should be noted that the above network device 1100 in this embodiment may be the network device of any embodiment in method embodiments of the present disclosure. Any implementation modes of the network device in the method embodiments of the present disclosure may be implemented by the network device 1100 in this embodiment and same effects may be achieved, which are not repeated here.

Figure 13:
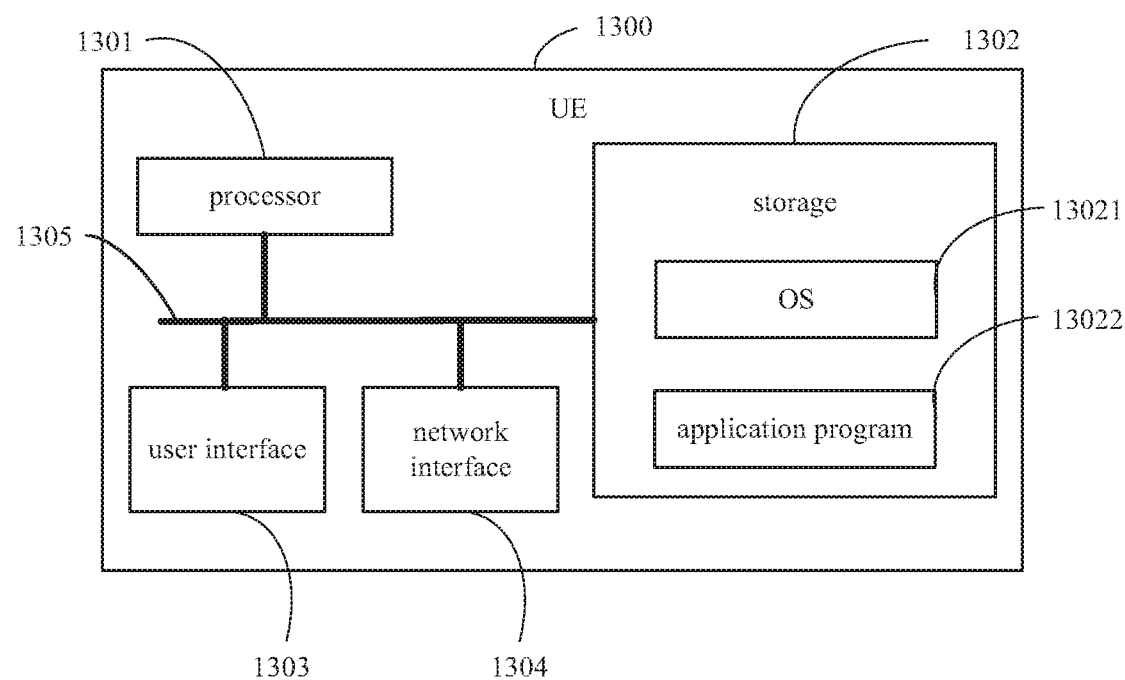
FIG. 13 is a schematic diagram illustrating structure of another UE in accordance with various embodiments of the present disclosure.

Referring to FIG. 13, FIG. 13 is a diagram illustrating structure of a UE in accordance with various embodiments of the present disclosure. As shown in FIG. 13, the UE 1300 includes: at least one processor 1301, a storage 1302, at least one network interface 1304 and a user interface 1303. Each component in the UE 1300 is coupled together via a bus system 1305. It can be understood that the bus system 1305 is configured to implement the connection and communication among the components. The bus system 1305 includes a power bus, control bus, state signal bus besides a data bus. For the clarity of description, each bus in the FIG. 13 is denoted as the bus system 1305.

The user interface 1303 may include a monitor, keyboard, or clickable device (for example, a mouse, track ball, touchpad, or touch screen).

It can be understood that the storage 1302 in embodiments of the present disclosure can be a volatile storage or a nonvolatile storage, or both the volatile storage and nonvolatile storage. The nonvolatile storage can be Read Only Memory (ROM), Programmable Read-Only Memory (PROM), Erasable Programmable Read-Only Memory (EPROM), Electrically Erasable Programmable Read-Only Memory (EEPROM) or flash. The volatile storage can be a Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DRRAM). The storage 302 in the system and method described in embodiments of the present disclosure include, but is not limited to, these and any other suitable types of storages.

In some embodiments, the storage 1302 stores following elements, such as executable modules, data structure, subset thereof, or superset thereof: OS 13021 and an application program 13022.

The OS 13021 includes various kinds of system programs, such as a framework layer, a core library layer and a driver layer, which are used to implement various kinds of basic services and process hardware-based tasks. The application program 13022 includes various kinds of application programs, such as Media Player and Browser, which are used to implement various kinds of application services. Programs, which are used to implement the methods in embodiments of the present disclosure, may be included in the application program 13022.

In an embodiment of the present disclosure, via calling the programs or instructions stored in the storage 1302, specifically, such as the programs or instructions stored in the application program 1302, the processor 1301 may be configured to:

receive a target signal transmitted from a network device; and perform blind detection on Physical Downlink Control Channel (PDCCH) or maintain a sleep state based on the target signal when the PDCCH is detected.

The methods in the above embodiments of the present disclosure may be applied to or implemented by the processor 1301. The processor 1301 may be an integrated circuit chip with signal processing capability. In the implementation process, each step of the above method can be completed by the integrated logic circuit of the hardware in processor 1301 or the instructions in the form of software. The Processor 1301 mentioned above may be a general purpose Processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in embodiments of the present disclosure may be realized or implemented. A general-purpose processor can be a microprocessor or the general-purpose processor can be any regular processor, etc. The steps in combination with the method disclosed in embodiments of the present disclosure may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The storage medium is located in storage 1302, and the processor 1301 reads the information in the storage 1302 to implement steps in the above method in combination with the hardware.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the target signal includes a wake-up signal.

The step of performing the blind detection on the PDCCH or maintaining the sleep state based on the target signal when a target detection is performed executed by the processor 1301 includes:

performing the blind detection on the PDCCH based on the wake-up signal.

Optionally, the target signal includes a sleep signal.

The step of performing the blind detection on the PDCCH or maintaining the sleep state based on the target signal when a target detection is performed executed by the processor 1301 includes:

maintaining the sleep state based on the sleep signal when the PDCCH is detected.

Optionally, the target signal includes a target sequence.

Optionally, the target sequence includes: a maximum linear feedback shift register sequence, a Gold sequence or Zadoff-Chu (ZC) sequence; or the target sequence includes: a sequence, which is generated by modulating at least two of the maximum linear feedback shift register sequence, Gold sequence and ZC sequence; or the target sequence includes: a sequence associated with a cell Identifier (ID).

Optionally, before the step of receiving the target signal transmitted from the network device, the processor 1301 is further configured to:

receive configuration information from the network device, wherein the configuration information includes: at least one of a generator polynomial, initial state, root sequence, cyclic shift and time to receive the target signal.

The step of performing the blind detection on the PDCCH or maintaining the sleep state based on the target signal when the PDCCH is detected executed by the processor 1301 includes:

performing the blind detection on the PDCCH or maintaining the sleep state based on the configuration information and the target information when the PDCCH is detected.

Optionally, the step of receiving the target signal transmitted from the network device executed by the processor 1301 includes:

receiving the target signal transmitted from the network device when the UE performs radio resource management measurement.

Optionally, the step of receiving the target signal transmitted from the network device executed by the processor 1301 includes:

receiving the target signal transmitted from the network device at a moment corresponding to a synchronization signal block;

receiving the target signal transmitted from the network device in a bandwidth corresponding to the synchronization signal block; or receiving the target signal transmitted from the network device at the moment corresponding to the synchronization signal block and in the bandwidth corresponding to the synchronization signal block.

Optionally, the step of receiving the target signal transmitted from the network device at the moment corresponding to the synchronization signal block executed by the processor 1301 includes:

receiving the target signal, which is transmitted from the network device on idle resources of Orthogonal Frequency Division Multiplexing (OFDM) symbols, at which a primary synchronization signal included in the synchronization signal block is located; or receiving the target signal, which is transmitted from the network device on idle resources of OFDM symbols, at which a secondary synchronization signal included in the synchronization signal block is located; or receiving the target signal, which is transmitted from the network device on the idle resources of the OFDM symbols, at which the primary synchronization signal included in the synchronization signal block is located and on the idle resources of the OFDM symbols, at which the secondary synchronization signal included in the synchronization signal block is located; or receiving the target signal, which is transmitted from the network device on idle OFDM symbols of a slot, at which the synchronization signal block is located; or receiving the target signal, which is transmitted from the network device on all or partial of idle resources of the synchronization signal block.

The idle resources include resources in resources occupied by the synchronization signal block except for resources occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Optionally, the step of receiving the target signal from the network device in the bandwidth corresponding to the synchronization signal block executed by the processor 1301 includes:

receiving the target signal transmitted from the network device on partial or all sub-carriers for transmitting the synchronization signal block.

Optionally, the step of receiving the target signal transmitted from the network device executed by the processor 1301 includes:

receiving the target signal transmitted from the network device on predefined or preconfigured time frequency resources.

Optionally, step of performing the blind detection on the PDCCH or maintaining the sleep state based on the target signal when the PDCCH is detected executed by the processor includes:

when the target signal transmitted from the network device is correctly decoded, making a determination that the target signal transmitted from the network device is received, performing the blind detection on the PDCCH or maintaining the sleep state when the PDCCH is detected, the target signal is a target signal, which is predefined or preconfigured on the time frequency resources and encoded and scrambled by the network device; or when detecting that power of the target signal transmitted from the network device is larger than a preset threshold, making a determination that the target signal transmitted from the network device is received, performing the blind detection on the PDCCH or maintaining the sleep state when the PDCCH is detected, wherein the target signal is the target signal, which is predefined or preconfigured on the time frequency resources and is obtained after amplitude of the target signal is modulated by the network device, and the power of the target signal is associated with the modulated amplitude.

Optionally, the step of receiving the target signal transmitted from the network device executed by the processor includes:

when a period of a synchronization signal block set is larger than a discontinuous reception period of the UE, receiving at least one of at least two target signals transmitted from the network device in the period of the synchronization signal block set; or when the period of the synchronization signal block set is larger than the discontinuous reception period of the UE, receiving the target signal transmitted from the network device in a configured slot; or when the period of the synchronization signal block set is larger than the discontinuous reception period of the UE, receiving at least one of target signals transmitted from the network device in the period of at least one of two adjacent synchronization signal block sets and in the configured slot.

The configured slot is a slot configured by the network device in an interval of two adjacent synchronization signal block sets.

Optionally, the step of receiving the target signal transmitted from the network device executed by the processor 1301 includes:

receiving the target signal transmitted from the network device on a target beam, wherein the target beam is a beam used by the network device for transmitting the synchronization signal block.

It should be noted that the above UE 1300 in this embodiment may be the UE of any implementation mode in method embodiments of the present disclosure. Any implementation modes of the UEs in the method embodiments of the present disclosure may be implemented by the above UE 1300 in this embodiment and same effects may be achieved, which are not repeated here.

Figure 14:
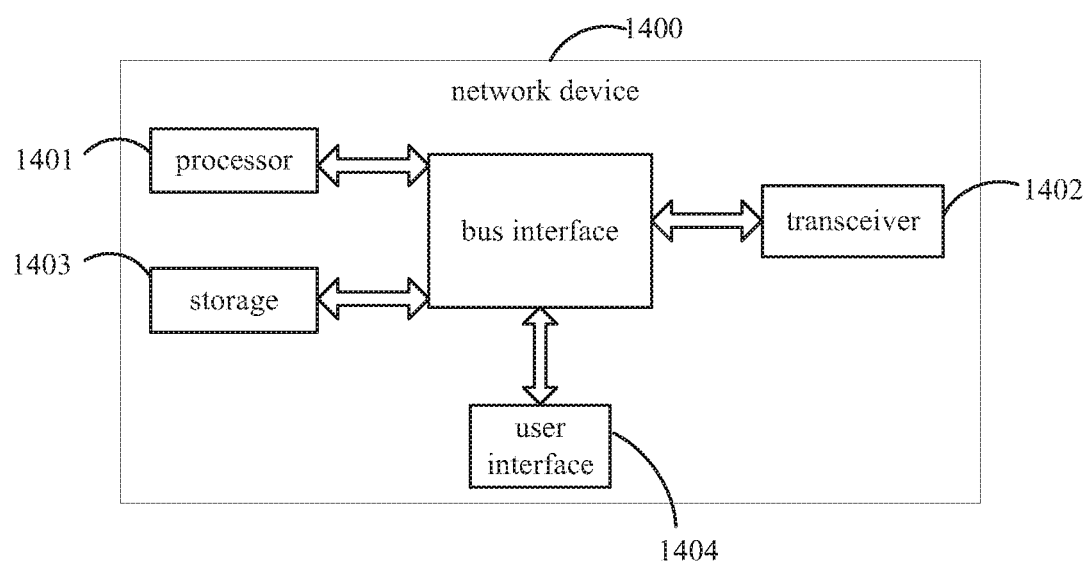
FIG. 14 is a schematic diagram illustrating structure of another network device in accordance with various embodiments of the present disclosure.

Referring to FIG. 14, FIG. 14 is a diagram illustrating structure of a network device in accordance with various embodiments of the present disclosure. As shown in FIG. 14, the network device 1400 includes: a processor 1401, a transceiver 1402, a storage 1403, a user interface 1404 and a bus interface.

The processor 1401 is configured to read programs in the storage 1403 to execute the following processes:

transmitting a target signal to a User Equipment (UE), to make the UE perform blind detection on Physical Downlink Control Channel (PDCCH) or maintain a sleep state when the PDCCH is detected.

The transceiver 1402 is configured to receive and transmit data under the control of the processor 1401 and the transceiver 1402 includes at least two antenna ports.

In FIG. 14, the bus architecture can include any number of interconnected buses and bridges, which are specifically linked by various circuits, such as one or more processors represented by processor 1401 and one or more storages represented by storage 1403. The bus architecture can also link various other circuits such as peripheral devices, voltage regulators, and power management circuits, all of which are well known in this field and are therefore not further described in the present disclosure. The bus interface provides an interface. The transceiver 1402 may include a plurality of components, i.e. a transmitter and a transceiver and provide a unit for communicating with various other devices on the transmission medium. As for different UEs, the user interface 1404 may further externally connect or internally connect interfaces of required devices. The connected devices may include but not be limited to a keypad, monitor, speaker, microphone, joystick, etc.

The processor 1401 is responsible for managing bus architecture and general processing. The storage 1403 may store data used by the processor 1401 when the processor 1401 executes operations.

Optionally, the step of transmitting the target signal to the UE, to make the UE perform the blind detection on the PDCCH or maintain the sleep state when the PDCCH is detected, which is executed by the processor 1401, includes:

transmitting a wake-up signal to the UE to wake up the UE to perform the blind detection on the PDCCH based on the wake-up signal.

Optionally, the step of transmitting the target signal to the UE, to make the UE perform the blind detection on the PDCCH or maintain the sleep state when the PDCCH is detected, which is executed by the processor 1401, includes:

transmitting a sleep signal to the UE to make the UE maintain the sleep state based on the sleep signal when the PDCCH is detected.

Optionally, the target signal includes a target sequence.

Optionally, the target sequence includes: a maximum linear feedback shift register sequence, Gold sequence or Zadoff-Chu (ZC) sequence; or the target sequence includes: a sequence, which is generated by modulating at least two of the maximum linear feedback shift register sequence, Gold sequence and ZC sequence; or the target sequence includes: a sequence associated with a cell Identifier (ID).

Optionally, before the step of transmitting the target signal to the UE, the processor 1401 is further configured to:

transmit configuration information to the UE, wherein the configuration information includes: at least one of a generator polynomial, initial state, root sequence, cyclic shift and time to receive the target signal.

Optionally, the step of transmitting the target signal to the UE executed by the processor 1401 includes:

transmitting the target signal to the UE when the UE performs radio resource management measurement.

Optionally, the step of transmitting the target signal to the UE executed by the processor 1401 includes:

transmitting the target signal to the UE at a moment corresponding to a synchronization signal block;

transmitting the target signal to the UE in a bandwidth corresponding to the synchronization signal block; or transmitting the target signal to the UE at the moment corresponding to the synchronization signal block and in the bandwidth corresponding to the synchronization signal block.

Optionally, the step of transmitting the target signal to the UE at the moment corresponding to the synchronization signal block, which is executed by the processor 1401, includes:

transmitting the target signal to the UE on idle resources of Orthogonal Frequency Division Multiplexing (OFDM) symbols, at which a secondary synchronization signal included in the synchronization signal block is located; or transmitting the target signal to the UE on idle resources of OFDM symbols, at which a primary synchronization signal included in the synchronization signal block is located; or transmitting the target signal to the UE on the idle resources of the OFDM symbols, at which the primary synchronization signal included in the synchronization signal block is located and on the idle resources of the OFDM symbols, at which the secondary synchronization signal included in the synchronization signal block is located; or transmitting the target signal to the UE on idle OFDM symbols of a slot, at which the synchronization signal block is located; or transmitting the target signal to the UE on all or partial of idle resources of the synchronization signal block.

The idle resources include resources in resources occupied by the synchronization signal block except for resources occupied by the primary synchronization signal, secondary synchronization signal, physical broadcast channel signal and physical broadcast channel demodulation reference signal. The idle OFDM symbols include OFDM symbols in OFDM symbols of the slot, at which the synchronization signal block is located, except for OFDM symbols occupied by a Downlink (DL) control channel, an Uplink (UL) control channel and a guard interval.

Optionally, the step of transmitting the target signal to the UE in the bandwidth corresponding to the synchronization signal block, which is executed by the processor 1401, includes:

transmitting the target signal to the UE on partial or all sub-carriers for transmitting the synchronization signal block.

Optionally, the step of transmitting the target signal to the UE executed by the processor 1401 includes:

transmitting the target signal to the UE on predefined or preconfigured time frequency resources.

Optionally, the step of transmitting the target signal to the UE on predefined or preconfigured time frequency resources, which is executed by the processor 1401, includes:

encoding and scrambling the target signal and transmitting the encoded and scrambled target signal to the UE on the predefined or preconfigured time frequency resources;

modulating amplitude of the target signal and transmitting the target signal, the amplitude of which has been modulated, to the UE on the predefined or preconfigured time frequency resources.

Optionally, the step of transmitting the target signal to the UE executed by the processor 1401 includes:

when a period of a synchronization signal block set is larger than a discontinuous reception period of the UE, transmitting at least two target signals to the UE in the period of the synchronization signal block; or when the period of the synchronization signal block set is larger than the discontinuous reception period of the UE, configuring a slot in an interval between two adjacent synchronization signal block sets and transmitting the target signal in the configured slot; or when the period of the synchronization signal block set is larger than the discontinuous reception period of the UE, configuring the slot in the interval between two adjacent synchronization signal block sets and transmitting the target signal in the period of at least one of adjacent synchronization signal block sets and in the configured slot.

Optionally, the step of transmitting the target signal to the UE executed by the processor 1401 includes:

receiving the target signal transmitted from the network device on a target beam, wherein the target beam is a beam used by the network device for transmitting the synchronization signal block.

It should be noted that the above network device 1400 in this embodiment may be the network device of any implementation mode in the method embodiments of the present disclosure. Any implementation mode of the network device in the method embodiments of the present disclosure may be implemented by the network device 1400 in this embodiment and same effects may be achieved, which are not repeated here.

Embodiments of the present disclosure further provide a computer readable storage medium. The computer readable storage medium stores blind detection programs. When the blind detection programs are executed by the processor, steps of the blind detection method provided by embodiments of the present disclosure may be implemented.

Embodiments of the present disclosure further provide a computer readable storage medium. The computer readable storage medium stores blind detection programs. When the blind detection programs are executed by the processor, steps of the blind detection method of the network device provided by embodiments of the present disclosure may be implemented.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above can refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

When the functions are implemented in the form of a software function unit and sold or used as a separate product, the software function unit may be stored in a computer readable storage medium. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure. The storage medium may be various kinds of medium that may store the program codes, such as the U disk, a mobile hard disk, Read-Only Memory (ROM), Random Access Memory (RAM), a diskette or a CD-ROM, etc.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure. Therefore, the protection scope of the present disclosure shall be subject to the protection scope of the claims.

What is claimed is:

1. A blind detection method, applied to a User Equipment (UE), comprising:
    receiving a target signal transmitted from a network device; and
    based on the target signal, performing blind detection on Physical Downlink Control Channel (PDCCH) or maintaining a sleep state when detecting the PDCCH;
    wherein the target signal comprises a target sequence;
    the target sequence comprises: a sequence, which is generated by modulating at least two of the maximum linear feedback shift register sequence, Gold sequence and ZC sequence;
    the target sequence is a sequence associated with a cell Identifier (ID).

2. The method according to claim 1, wherein the target signal comprises a wake-up signal;
    wherein the step of based on the target signal, performing the blind detection on the PDCCH or maintaining the sleep state when detecting the PDCCH, comprises:
    performing the blind detection on the PDCCH based on the wake-up signal; or,
    wherein the target signal comprises a sleep signal;
    wherein the step of based on the target signal, performing the blind detection on the PDCCH or maintaining the sleep state when detecting the PDCCH, comprises:
    based on the sleep signal, maintaining the sleep state when detecting the PDCCH.

3. The method according to claim 1, wherein the step of receiving the target signal transmitted from the network device, comprises:
    receiving the target signal transmitted from the network device when the UE performs radio resource management measurement.

4. The method according to claim 1, wherein the step of receiving the target signal transmitted from the network device, comprises:
    receiving the target signal transmitted from the network device at a moment corresponding to a synchronization signal block;
    receiving the target signal transmitted from the network device in a bandwidth corresponding to the synchronization signal block; or
    receiving the target signal transmitted from the network device at the moment corresponding to the synchronization signal block and in the bandwidth corresponding to the synchronization signal block.

5. The method according to claim 4, wherein the step of receiving the target signal transmitted from the network device at the moment corresponding to the synchronization signal block, comprises:
    receiving the target signal, which is transmitted from the network device on idle resources of Orthogonal Frequency Division Multiplexing (OFDM) symbols, at which a primary synchronization signal included in the synchronization signal block is located; or
    receiving the target signal, which is transmitted from the network device on idle resources of OFDM symbols, at which a secondary synchronization signal included in the synchronization signal block is located; or
    receiving the target signal, which is transmitted from the network device on the idle resources of the OFDM symbols, at which the primary synchronization signal included in the synchronization signal block is located and on the idle resources of the OFDM symbols, at which the secondary synchronization signal included in the synchronization signal block is located; or
    receiving the target signal, which is transmitted from the network device on idle OFDM symbols of a slot, at which the synchronization signal block is located; or
    receiving the target signal, which is transmitted from the network device on all or partial of idle resources of the synchronization signal block;
    wherein the idle resources comprise resources in resources occupied by the synchronization signal block except for resources occupied by the primary synchronization signal, secondary synchronization signal, physical broadcast channel signal and physical broadcast channel demodulation reference signal; the idle OFDM symbols comprise OFDM symbols in OFDM symbols of the slot, at which the synchronization signal block is located, except for OFDM symbols occupied by a Downlink (DL) control channel, an Uplink (UL) control channel and a guard interval; or, wherein the step of receiving the target signal from the network device in the bandwidth corresponding to the synchronization signal block, comprises:
receiving the target signal transmitted from the network device on partial or all sub-carriers for transmitting the synchronization signal block.

6. The method according to claim 1, wherein the step of receiving the target signal transmitted from the network device, comprises:
receiving the target signal transmitted from the network device on predefined or preconfigured time frequency resources;
wherein the step of based on the target signal, performing the blind detection on the PDCCH or maintaining the sleep state when detecting the PDCCH, comprises:
when the target signal transmitted from the network device is correctly decoded, making a determination that the target signal transmitted from the network device is received, performing the blind detection on the PDCCH or maintaining the sleep state when detecting the PDCCH;
wherein the target signal is a target signal, which is predefined or preconfigured on the time frequency resources and encoded and scrambled by the network device; or
when detecting that power of the target signal transmitted from the network device is larger than a preset threshold, making a determination that the target signal transmitted from the network device is received, performing the blind detection on the PDCCH or maintaining the sleep state when detecting the PDCCH; wherein the target signal is the target signal, which is predefined or preconfigured on the time frequency resources and is obtained after amplitude of the target signal is modulated by the network device, and the power of the target signal is associated with the modulated amplitude.

7. The method according to claim 1, wherein the step of receiving the target signal transmitted from the network device comprises:
when a period of a synchronization signal block set is larger than a discontinuous reception period of the UE, receiving at least one of at least two target signals transmitted from the network device in the period of the synchronization signal block set; or
when the period of the synchronization signal block set is larger than the discontinuous reception period of the UE, receiving the target signal transmitted from the network device in a configured slot; or
when the period of the synchronization signal block set is larger than the discontinuous reception period of the UE, receiving at least one of target signals transmitted from the network device in the period of at least one of two adjacent synchronization signal block sets and in the configured slot;
wherein the configured slot is a slot configured by the network device in an interval of two adjacent synchronization signal block sets.

8. The method according to claim 1, wherein the step of receiving the target signal transmitted from the network device, comprises:
receiving the target signal transmitted from the network device on a target beam; wherein the target beam is a beam used by the network device for transmitting the synchronization signal block.

9. A signal transmission method, applied to a network device, comprising:
transmitting a target signal to a User Equipment (UE), so that the UE performs blind detection on Physical Downlink Control Channel (PDCCH) or maintains a sleep state when detecting the PDCCH;
wherein the target signal comprises a target sequence;
the target sequence comprises: a sequence, which is generated by modulating at least two of the maximum linear feedback shift register sequence, Gold sequence and ZC sequence;
the target sequence is a sequence associated with a cell Identifier (ID).

10. The method according to claim 9, wherein the step of transmitting the target signal to the UE, so that the UE performs the blind detection on the PDCCH or maintains the sleep state when detecting the PDCCH, comprises:
transmitting a wake-up signal to the UE to wake up the UE to perform the Hind detection on the PDCCH based on the wake-up signal; or,
wherein the step of transmitting the target signal to the UE, so that the UE performs the blind detection on the PDCCH or maintains the sleep state when detecting the PDCCH, comprises:
transmitting a sleep signal to the UE, so that the UE maintains the sleep state based on the sleep signal when detecting the PDCCH.

11. The method according to claim 9, Wherein the step of transmitting the target signal to the UE, comprises:
transmitting the target signal to the UE when the UE performs radio resource management measurement.

12. The method according to claim 9, wherein the step of transmitting the target signal to the UE, comprises:
transmitting the target signal to the UE at a moment corresponding to a synchronization signal block;
transmitting the target signal to the UE in a bandwidth corresponding to the synchronization signal block; or
transmitting the target signal to the UE at the moment corresponding to the synchronization signal block and in the bandwidth corresponding to the synchronization signal block.

13. The method according to claim 12, wherein the step of transmitting the target signal to the UE at the moment corresponding to the synchronization signal block, comprises:
transmitting the target signal to the UE on idle resources of Orthogonal Frequency Division Multiplexing (OFDM) symbols, at which a secondary synchronization signal included in the synchronization signal block is located; or
transmitting the target signal to the UE on idle resources of OFDM symbols, at which a primary synchronization signal included in the synchronization signal block is located; or
transmitting the target signal to the UE on the idle resources of the OFDM symbols, at which the primary synchronization signal included in the synchronization signal block is located and on the idle resources of the OFDM symbols, at which the secondary synchronization signal included in the synchronization signal block is located; or
transmitting the target signal to the UE on idle OFDM symbols of a slot, at which the synchronization signal block is located; or
transmitting the target signal to the UE on all or partial of idle resources of the synchronization signal block;
wherein the idle resources comprise resources in resources occupied by the synchronization signal block except for resources occupied by the primary synchronization signal, secondary synchronization signal, physical broadcast channel signal and physical broadcast channel demodulation reference signal; the idle OFDM symbols comprise OFDM symbols in OFDM symbols of the slot, at which the synchronization signal block is located, except for OFDM symbols occupied by a Downlink (DL) control channel, an Uplink (UL) control channel and a guard interval; or, wherein the step of transmitting the target signal to the UE in the bandwidth corresponding to the synchronization signal block, comprises:

transmitting the target signal to the UE on partial or all sub-carriers for transmitting the synchronization signal block.

14. The method according to claim 9, wherein the step of transmitting the target signal to the UE, comprises:

transmitting the target signal to the UE on predefined or preconfigured time frequency resources;

wherein the step of transmitting the target signal to the UE on predefined or preconfigured time frequency resources, comprises:

encoding and scrambling the target signal and transmitting the encoded and scrambled target signal to the UE on the predefined or preconfigured time frequency resources; or, modulating amplitude of the target signal and transmitting the target signal, the amplitude of which has been modulated, to the UE on the predefined or preconfigured time frequency resources.

15. The method according to claim 9, wherein the step of transmitting the target signal to the USE, comprises:

when a period of a synchronization signal block set is larger than a discontinuous reception period of the UE, transmitting at least two target signals to the UE in the period of the synchronization signal block; or when the period of the synchronization signal block set is larger than the discontinuous reception period of the UE, configuring a slot in an interval between two adjacent synchronization signal block sets and transmitting the target signal in the configured slot; or when the period of the synchronization signal block set is larger than the discontinuous reception period of the UE, configuring the slot in the interval between two adjacent synchronization signal block sets and transmitting the target signal in a period of at least one of adjacent synchronization signal block sets and in the configured slot.

16. The method according to claim 9, wherein the step of transmitting the target signal to the UE, comprises:

transmitting the target signal to the UE on a target beam; wherein the target beam is a beam used by the network device for transmitting the synchronization signal block.

17. A User Equipment (UE), comprising: a processor, a storage, a network interface and a user interface; wherein the processor, the storage, the network interface and the user interface are coupled together via a bus system, and the processor is configured to read programs in the storage to execute a blind detection method which comprises:

receiving a target signal transmitted from a network device; and based on the target signal, performing blind detection on Physical Downlink Control Channel (PDCCH) or maintaining a sleep state when detecting the PDCCH;

wherein the target signal comprises a target sequence;

the target sequence comprises: a sequence, which is generated by modulating at least two of the maximum linear feedback shift register sequence, Gold sequence and ZC sequence;

the target sequence is a sequence associated with a cell identifier (ID).

18. The user equipment according to claim 17, wherein the target signal comprises a wake-up signal; and the processor is configured to read the programs in the storage to perform the blind detection on the PDCCH based on the wake-up signal;

or, wherein the target signal comprises a sleep signal; and the processor is configured to read the programs in the storage to, based on the sleep signal; maintain the sleep state when detecting the PDCCH.

19. The user equipment according to claim 17, wherein when receiving the target signal transmitted from the network device, the processor is configured to read the programs in the storage to receive the target signal transmitted from the network device when the UE performs radio resource management measurement.

20. A network device, comprising: a processor, a storage, a transceiver and a user interface; wherein the processor, the storage, the transceiver and the user interface are coupled together via a bus system, and the processor is configured to read programs in the storage to execute steps in the signal transmission method in claim 9.

* * * * *